(12) United States Patent
Roper et al.

(10) Patent No.: US 11,535,360 B1
(45) Date of Patent: Dec. 27, 2022

(54) HYPERSONIC LEADING-EDGE HEAT PIPE WITH POROUS WICK, AND METHODS OF MAKING AND USING THE SAME

(71) Applicant: HRL Laboratories, LLC, Malibu, CA (US)

(72) Inventors: Christopher S. Roper, Santa Monica, CA (US); Mark R. O'Masta, Oak Park, CA (US); Tobias A. Schaedler, Oak Park, CA (US); Jacob M. Hundley, Thousand Oaks, CA (US); Tiffany Stewart, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 88 days.

(21) Appl. No.: 16/876,077

(22) Filed: May 17, 2020

Related U.S. Application Data

(60) Provisional application No. 62/858,830, filed on Jun. 7, 2019.

(51) Int. Cl.
*B64C 3/36* (2006.01)
*B64C 30/00* (2006.01)
(Continued)

(52) U.S. Cl.
CPC ............... *B64C 3/36* (2013.01); *B21D 53/02* (2013.01); *B33Y 10/00* (2014.12); *B33Y 80/00* (2014.12); *B64C 30/00* (2013.01); *F28D 15/046* (2013.01)

(58) Field of Classification Search
CPC . B64C 1/38; B64C 3/36; F28D 15/046; F28D 15/04; B64G 1/58; B64G 1/506; F42B 15/34
See application file for complete search history.

(56) References Cited

U.S. PATENT DOCUMENTS 4,838,346 A   6/1989   Camarda et al.
4,883,116 A   11/1989  Seidenberg et al.
(Continued)

OTHER PUBLICATIONS

Chien-Chih Yeh, Chun-Nan Chen, Yau-Ming Chen, Heat transfer analysis of a loop heat pipe with biporous wicks, 2009, International Journal of Heat and Mass Transfer, vol. 52, Issues 19-20 (Year: 2009).*

(Continued)

*Primary Examiner* — Richard R. Green
*Assistant Examiner* — Madison Elizabeth Dittner
(74) *Attorney, Agent, or Firm* — O'Connor & Company; Ryan P. O'Connor

(57) ABSTRACT

Some variations provide a leading-edge heat pipe comprising: (a) an envelope fabricated from a shell material, wherein the envelope includes at least one edge with a radius of curvature of less than 3 mm, and wherein the envelope includes, or is in thermal communication with, at least one heat-rejection surface; (b) a porous wick fabricated from a ceramic or metallic wick material, wherein the porous wick is configured within a first portion of the interior cavity, wherein at least a portion of the porous wick is adjacent to the inner surface, and wherein the porous wick has a bimodal pore distribution comprising an average capillary-pore size from 0.2 microns to 200 microns and an average high-flow pore size from 100 microns to 2 millimeters (the average high-flow pore size is greater than the average capillary-pore size); and (c) a phase-change heat-transfer material contained within the porous wick.

27 Claims, 16 Drawing Sheets

(51) Int. Cl.
  *F28D 15/04* (2006.01)
  *B21D 53/02* (2006.01)
  *B33Y 10/00* (2015.01)
  *B33Y 80/00* (2015.01)

(56) References Cited

U.S. PATENT DOCUMENTS

| | | | | |
|---|---|---|---|---|
| 5,299,762 | A * | 4/1994 | Kosson | B64G 1/58 |
| | | | | 244/130 |
| 5,720,339 | A | 2/1998 | Glass et al. | |
| 7,128,532 | B2 * | 10/2006 | Petervary | B64C 1/38 |
| | | | | 416/97 R |
| 7,275,720 | B2 * | 10/2007 | Behrens | B64C 1/38 |
| | | | | 244/121 |
| 8,191,616 | B2 * | 6/2012 | Behrens | B64C 1/40 |
| | | | | 165/41 |
| 8,844,877 | B1 | 9/2014 | Driemeyer et al. | |
| 9,920,530 | B2 | 3/2018 | Wadley et al. | |
| 11,260,953 | B2 * | 3/2022 | Rathay | B64C 3/36 |
| 2014/0174085 | A1 * | 6/2014 | Kare | F01K 25/12 |
| | | | | 60/670 |
| 2017/0054155 | A1 * | 2/2017 | Yee | H01M 6/36 |

OTHER PUBLICATIONS

Kasen, "Thermal Management at Hypersonic Leading Edges", Ph D. Dissertation, University of Virginia, May 2013.

Glass, "Ceramic Matrix Composite (CMC) Thermal Protection Systems (TPS) and Hot Structures for Hypersonic Vehicles", 15th AIAA Space Planes and Hypersonic Systems and Technologies Conference, American Institute of Aeronautics and Astronautics, https://ntrs.nasa.gov/search.jsp?R=20080017096 2019-11-12T21:20:43+00:00Z.

* cited by examiner

HYPERSONIC LEADING-EDGE HEAT PIPE WITH POROUS WICK, AND METHODS OF MAKING AND USING THE SAME

PRIORITY DATA

This patent application is a non-provisional application with priority to U.S. Provisional Patent App. No. 62/858,830, filed on Jun. 7, 2019, which is hereby incorporated by reference herein.

FIELD OF THE INVENTION

The present invention generally relates to reusable and expendable hypersonic vehicles; gas turbine engine components; rocket nozzles; other high-heat, high-stress environments; and leading-edge heat pipes configured for same.

BACKGROUND OF THE INVENTION

Hypersonic flight is flight through the atmosphere below about 90 km at speeds of about Mach 5 or higher, causing very high aerodynamic heating. The severe thermal environment to which vehicles are subjected during hypersonic flight pose significant technical challenges.

Hypersonic vehicle performance (lift-to-drag ratio) is currently limited by the temperature stability of the leading edge. Improving the range, speed, altitude (lower), and/or maneuverability of a hypersonic vehicle increases heat flux transferred to the leading edge. One mechanism to handle the incident heat flux is to operate the leading edge at higher temperatures, thus enabling higher heat rejection through radiative emissive cooling. However, research into higher-temperature materials has reached diminishing returns. High leading-edge heat fluxes can also be accommodated by spreading the heat over a larger area for radiative emissive cooling. However, it has been challenging to effectively spread the heat fast enough to a large enough area to remove the heat from the leading edge.

A number of thermal management systems have been identified to cool hypersonic vehicles. See Glass, "Ceramic Matrix Composite (CMC) Thermal Protection Systems (TPS) and Hot Structures for Hypersonic Vehicles", 15*th AIAA Int. Space Planes Hypersonic Syst. Technol. Conf.*, American Institute of Aeronautics and Astronautics, 2008; and Kasen, *Thermal Management at Hypersonic Leading Edges*, Dissertation, University of Virginia, 2013, which are incorporated by reference.

Thermal management systems can be grouped into active and passive systems. An actively cooled system is one that requires pumped coolant to absorb and remove heat. While necessitating either additional material or energy from the vehicle, actively cooled systems are useful for higher heat fluxes or longer operation times. Examples of active systems include convective cooling, film cooling, and transpiration cooling. Passive systems may involve a phase change but can function without additional energy or mass transfer from the vehicle for operation. Examples of passive systems include an insulated structure, a heat sink, a hot structure, an ablative structure, and a heat pipe.

In convective cooling, a coolant is forced through pores in the structure. The coolant absorbs heat from the hot portion of the structure, carrying it away to be dissipated elsewhere in the structure. The structure is maintained at a hot temperature to allow for heat exchange. An example of convective cooling is the U.S. Space Shuttle main engine.

In film cooling, coolant is injected into the flow stream. A thin, cool layer insulates the structure from the incident heat flux. However, the coolant must be injected upstream of the location to be cooled, which is a challenge for cooling of leading edges.

In transpiration cooling, a liquid coolant is forced into the free stream through the surface of the structure through an array of pores in the structure. The injection of coolant into the structure forms an insulation layer similar to film cooling. This type of cooling is typically employed in liquid rocket motors where fuel is used as the transpiration media.

Insulated structures may be used in passive thermal management systems. A high-temperature insulating layer, defined by a low thermal conductivity, is placed between the outer environment and the structure to resist thermal diffusion. Insulated structures are appropriate for moderate heat fluxes and short operation durations. Insulated structures primarily find use for large, non-structural systems due to the low fracture toughness of the materials typically used. An example of implementation is on the Space Shuttle orbiter elevons.

A heat sink is made from a material with a high thermal conductivity to spread the heat throughout the heat-sink material and a high heat capacity to enable greater storage of heat with the heat-sink material. While some heat is dissipated through radiative cooling, the primary means of heat management is storage, necessitating a sufficiently large heat-sink mass if large integrated heat loads are encountered during flight (as is the case for most hypersonic vehicles). However, a large heat-sink mass is in conflict with flight vehicle design requirements. As such, heat sinks are limited to transient, moderate heat fluxes, as prolonged heating will overheat the structure. An example of implementation is on the leading edge of the X-15 (hypersonic rocket-powered aircraft).

A hot structure uses a higher-temperature material than would be found on a heat sink. By operating at higher temperatures, the hot structure can balance the incident heat flux with heat dissipation through radiative cooling. Implicit in this design is that the entire structure will increase to elevated temperatures. A hot structure works well for higher heat fluxes and for longer durations than other passive systems. An example of a hot structure is reinforced carbon-carbon composites found on the nose and leading edges of U.S. Space Shuttles.

For ablative structures (a semi-passive system), the material is selected such that when the incident heat flux is sufficiently high, the material undergoes a combination of endothermic phase changes, endothermic chemical changes, and/or evaporative mass loss, all of which thermodynamically consume heat. Consumption of the ablator "blocks" the heat, keeping the underlying structure cool. Ablatives are useful for very high heat fluxes, but last for short durations. Examples of ablative heat shields are found on Mercury, Gemini, and Apollo U.S. spacecraft.

A heat pipe uses a working fluid to absorb heat from the hot portion of the structure and carry it away to be dissipated elsewhere in the structure. The heat can either be internally stored by heating of some component or be rejected from the structure surface via radiation cooling, similar to a hot structure. The working fluid enables an effective thermal conductivity that is orders of magnitude greater than solid materials found in hot structures. In contrast to forced convective cooling, which requires energy from the vehicle, working-fluid mass transport in heat pipes is passively driven by harvested thermal energy. Heat pipes have effective thermal conductivities up to $10^4$ times greater than solid copper and require no energy input other than the thermal input that is being transferred away in the heat pipe. Heat pipes offer a method to mitigate high heat fluxes, which persist for long times.

Heat pipes offer the best of both active and passive systems: they can mitigate high heat fluxes unlike other passive systems, and they have the benefit of not requiring addition mass or energy from the vehicle in contrast to the high-performing active systems. In contrast to ablative systems, heat pipes can last for longer periods as the system does not thermally degrade.

A heat pipe is a hermetically sealed structure, comprising an outer shell, a wick, and a working fluid. A heat pipe operates by heating a working fluid to evaporation near the location of highest temperature. The energy stored (primarily from the latent heat of evaporation) in the evaporated working fluid (vapor) is transported along the heat pipe until it condenses on a cooler segment, releasing its stored energy. This energy release warms the structure, providing a mechanism to efficiently distribute the heat over a larger volume. The condensed liquid is then transported back to the location of highest heat flux through the wick via capillary action. This process repeats continuously. Working fluids that have been used include $H_2O$, $NH_3$, and metals with relatively low boiling points.

Heat pipes have been pursued for hypersonic leading-edge thermal management. For the Space Shuttle orbiter leading edges, NASA integrated discrete sodium-filled Hastelloy X heat pipes within a Hastelloy X skin (Camarda, "Analysis and radiant heating tests of a heat-pipe-cooled leading edge", NASA Tech Note D-8468, 1977; Camarda and Masek, "Design, Analysis, and Tests of a Shuttle-Type Heat-Pipe-Cooled Leading Edge" *Journal of Spacecraft and Rockets*, vol. 18, no. 1, pp. 71-78, 1981, which are incorporated by reference). The nose had an estimated radius of 10 cm. It sustained ~40 $W/cm^2$ heat flux, reducing the wall temperature from 1317° C. to 1012° C. A limitation to using nickel superalloys is that the temperature must remain below 1400° C.

D-shaped outer skins for heat pipes have been made from a Haynes 188 alloy and a high temperature niobium-based alloy (C-103) (Glass et al., "Fabrication and testing of a leading-edge-shaped heat pipe", *Journal of Spacecraft and Rockets*, vol. 36, no. 6, pp. 921-923, 1999; Clark and Glenn, "Design analysis and testing of liquid metal heat pipes for application to hypersonic vehicles", American Institute of Aeronautics and Astronautics—Thermophysics, Plasmadynamics and Lasers Conference, vol. 1, June 1988, which are incorporated by reference). However, the skin is formed by bending, which is problematic for making leading edges of less than about 10 millimeters or less, which is desirable for aerodynamic considerations.

Heat pipes were made from embedding discrete Li-filled molybdenum-rhenium (Mo—Re) heat pipes within a carbon-carbon composite (C/C) skin with a 1.27 cm radius (Glass et al., "Fabrication and testing of Mo—Re heat pipes embedded in carbon/carbon", *Journal of spacecraft and rockets*, vol. 36, no. 1, pp. 79-86, 1999, which is incorporated by reference). Individual heat pipes were formed from Mo—Re tubes that had a 400 mesh Mo—Re wick. These heat pipes were then embedded within C/C or C/SiC (3-D woven fabric) shell that had a silicon carbide (SiC) oxidation coating. The large thermal mismatch between Mo—Re and C/C was admitted by the authors to be a concern for operation at elevated temperatures.

In Kasen, *Thermal Management at Hypersonic Leading Edges*, Dissertation, University of Virginia, 2013 (which was incorporated by reference above), an integral leading-edge heat pipe was fabricated from a IN718 shell, with a 3 mm leading edge radius, and filled with Na working fluid and a Ni foam wick (elemental nickel with 450 µm average pore diameter). The design sustained a 67 $W/cm^2$ heat flux with a peak temperature of 1100° C.

Driemeyer et al. in U.S. Pat. No. 8,844,877, which is incorporated by reference, disclose a "fail-safe" wedge-shaped heat pipe for hypersonic leading edges. A porous wick layer is bonded to an outer envelope, leaving an internal plenum chamber. The plenum chamber is subdivided for redundancy. Details are given how to additively manufacture the heat pipe, including the wick, using metal additive 3D printing. Also discussed is the use of a carbon-carbon (C/C) composite skin that is further densified using SiC pre-ceramic polymers. The heat pipe is attached to the leading edge using bolt/fasteners at the rear end.

Wadley et al., U.S. Pat. No. 9,920,530, which is incorporated by reference, describes a facesheet heat-pipe system with a lattice structure for structural support. The facesheet itself is a composite comprised of either a thermal-barrier coating, a C/C composite, or a SiC/SiC composite intermetallic and a lattice. The lattice acts as a wick. The inner lattice is for structural support.

Also see Shah and Giovannelli, "Heat Pipe Heat Exchanger Design Theory" in *Heat Transf. Equipment Design*, Shah et al. editors, New York: Hemisphere Publishing Corp., 1988, which is incorporated by reference for its teachings of typical classes of wick structures for heat pipes.

Homogeneous wick structures may consist of wrapped (or wire) screens, which suffer from inconsistent contact between the structure and screen. Homogeneous wick structures may consist of sintered metal, which suffers from limited working temperature. Annular and crescent wicks provide low resistance to liquid flow and can transport more heat than wire screens. Axial groove screens provide low resistance to liquid flow but suffer from insufficient capillary pressure to drive mass transport.

Wicks using composite screens offer the ability to control pore size to allow for efficient liquid transport along the length of the heat pipe and rapid transport of heat through the wick. Layered wicks use different pore sizes. Fine pores are placed at the liquid/vapor interface to increase the capillary pressure driving flow, while larger pores in other layers reduce resistance to fluid flow. Axial grooves with a fine-pore mesh may be used for higher capillary pressure. An arterial wick with fine pores may surround a coarse pore mesh.

Seidenber et al. in U.S. Pat. No. 4,883,116, which is incorporated by reference, describe a uniformly porous, permeable, open-cell, silicon dioxide/alumina oxide inorganic ceramic foam for use in a capillary loop pump heat pipe.

Glass et al. in U.S. Pat. No. 5,720,339, which is incorporated by reference, describe a heat pipe using an arterial wick design for use on leading edges. The arterial wick is made by inserting a mesh with discrete heat pipe tubes. The design does not allow for fine control of the pore size, limits the free volume for vapor, and leads to hot spots between heat pipe locations.

Camarda et al. in U.S. Pat. No. 4,838,346, which is incorporated by reference, embed a refractory metal pipe within a carbon-carbon composite structure.

In view of the foregoing state of the art, improved heat pipes for hypersonic leading-edge thermal management are still desired. There is a need for faster, more-maneuverable, longer-range, and lower-altitude hypersonic vehicles that can be enabled by better leading-edge heat pipes. Manufacturing techniques existing heretofore limit the geometry of leading-edge heat pipes and thus limit their ultimate performance and the operational envelope of the hypersonic vehicle.

SUMMARY OF THE INVENTION

Some variations of the invention provide a leading-edge heat pipe comprising:

(a) an envelope fabricated from a shell material, wherein the envelope includes at least one edge with a radius of curvature of less than 3 mm, wherein said envelope has a thickness that increases with distance from said edge, wherein the envelope has an outer surface and an inner surface that encloses an interior cavity, and wherein the envelope includes, or is in thermal communication with, at least one heat-rejection surface;

(b) a porous wick fabricated from a ceramic or metallic wick material, wherein the porous wick is configured within a first portion of the interior cavity, and wherein at least a portion of the porous wick is adjacent to the inner surface; and (c) a phase-change heat-transfer material contained within the porous wick.

In some embodiments, the shell material is selected from the group consisting of carbon-carbon composites, ceramic matrix composites, metal matrix composites, refractory metals, metal alloys, metal superalloys, and combinations thereof.

In some embodiments, the ceramic or metallic wick material is selected from ceramics. In some embodiments, the ceramic or metallic wick material is not selected from metals or metal alloys.

In some embodiments, the ceramic or metallic wick material is selected from the group consisting of pyrolytic carbon, SiOC, SiC, $Si_3N_4$, silica, alumina, aluminum silicates, rare-earth silicates, rare earth aluminates, and combinations thereof.

In some embodiments, the ceramic or metallic wick material is selected from the group consisting of refractory metals or alloys thereof, nickel alloys, nickel superalloys, intermetallics, and combinations thereof.

In some embodiments, the inner surface of the shell material is at least partially coated with a shell coating selected for chemical compatibility between the shell coating and the phase-change heat-transfer material. In these or other embodiments, the porous wick is at least partially coated with a wick coating selected for chemical compatibility between the wick coating and the phase-change heat-transfer material. Chemical-compatibility coatings for the shell material and/or the porous wick are preferred, but are not necessary in certain embodiments, depending on selection of materials and working fluid, for example.

In some embodiments, the shell coating (when present) includes a shell-coating material selected from the group consisting of refractory metals or alloys thereof, nickel alloys, nickel superalloys, intermetallics, ceramics, and combinations thereof. In these or other embodiments, the wick coating (when present) includes a wick-coating material selected from the group consisting of refractory metals or alloys thereof, nickel alloys, nickel superalloys, intermetallics, ceramics, and combinations thereof. The shell-coating material and the wick-coating material may be the same or different.

In certain embodiments of the invention, the shell material is a carbon-carbon composite, the ceramic or metallic wick material is a ceramic, the phase-change heat-transfer material is an alkali metal, and the inner surface of the shell material is at least partially coated with a shell coating selected for chemical compatibility between the shell coating and the phase-change heat-transfer material.

The phase-change heat-transfer material may be selected from the group consisting of lithium, sodium, zinc, silver, potassium, cesium, and combinations or alloys thereof, for example. Note that the phase-change heat-transfer material is not always exclusively contained in the porous wick. During operation of the leading-edge heat pipe, some of the phase-change material will be contained outside of the porous wick, in the vapor phase.

In some embodiments, the phase-change heat-transfer material is further contained within a second portion of the interior cavity that is outside the first portion of the interior cavity, wherein the second portion of the interior cavity does not contain the porous wick.

In some embodiments, at least one heat-rejection surface is the same as the outer surface. In these or other embodiments, at least one heat-rejection surface is different than the outer surface.

The leading-edge heat pipe may be capable of a heat flux of about 400, 500, 600, 700, 800, 900, or 1000 W/cm$^2$ or greater.

The leading-edge heat pipe is preferably hermetically sealed. The leading-edge heat pipe may be integrated within a hypersonic vehicle, for example.

Other variations of the invention provide a leading-edge heat pipe comprising:

(a) an envelope fabricated from a shell material, wherein the envelope includes at least one edge with a radius of curvature less than 12 mm, wherein the envelope has an outer surface and an inner surface that encloses an interior cavity, and wherein the envelope includes, or is in thermal communication with, at least one heat-rejection surface;

(b) a porous wick fabricated from a ceramic or metallic wick material, wherein the porous wick is configured within a first portion of the interior cavity, wherein at least a portion of the porous wick is adjacent to the inner surface, and wherein the porous wick has a bimodal pore distribution comprising an average capillary-pore size from about 0.2 microns to about 200 microns and an average high-flow pore size from about 100 microns to about 2 millimeters, wherein the average high-flow pore size is greater than the average capillary-pore size; and (c) a phase-change heat-transfer material contained within the porous wick.

In some embodiments, the inner surface of the shell material is at least partially coated with a shell coating selected for chemical compatibility between the shell coating and the phase-change heat-transfer material.

In some embodiments, the porous wick is at least partially coated with a wick coating selected for chemical compatibility between the wick coating and the phase-change heat-transfer material.

In certain embodiments, the shell material is a carbon-carbon composite, the ceramic or metallic wick material is a ceramic, the phase-change heat-transfer material is an alkali metal, and the inner surface of the shell material is at least partially coated with a shell coating selected for chemical compatibility between the shell coating and the phase-change heat-transfer material.

The ceramic or metallic wick material may be selected from the group consisting of pyrolytic carbon, SiOC, SiC, Si$_3$N$_4$, silica, alumina, aluminum silicates, rare-earth silicates, rare earth aluminates, and combinations thereof, for example.

In some embodiments, at least some of the porous wick contains an interior wick region and an exterior wick region, wherein the interior wick region includes high-flow pores with the average high-flow pore size, and wherein the exterior wick region includes capillary pores with the average capillary-pore size.

In some embodiments, the radius of curvature is less than 6 mm, such as less than 3 mm.

The leading-edge heat pipe may be capable of a heat flux of about 400, 500, 600, 700, 800, 900, or 1000 W/cm$^2$ or greater.

The leading-edge heat pipe is preferably hermetically sealed. The leading-edge heat pipe may be integrated within a hypersonic vehicle, for example.

Other variations provide a method of making a leading-edge heat pipe, the method comprising:

selecting a shell material, a ceramic or metallic wick material, and a phase-change heat-transfer material as components of a leading-edge heat pipe;

providing an envelope fabricated from the shell material, wherein the envelope includes at least one edge with a radius of curvature of less than 12 mm (e.g., less than 3 mm), wherein said envelope has a thickness that increases with distance from said edge (e.g., the envelope is in the shape of a wedge), wherein the envelope has an outer surface and an inner surface that encloses an interior cavity, and wherein the envelope includes, or is in thermal communication with, at least one heat-rejection surface;

optionally coating at least a portion of the inner surface with a shell coating selected for chemical compatibility between the shell coating and the phase-change heat-transfer material;

optionally coating at least a portion of the outer surface with an anti-oxidation coating;

additive manufacturing a porous wick containing the ceramic or metallic wick material, wherein the porous wick is configured within a first portion of the interior cavity, and wherein at least a portion of the porous wick is adjacent to the inner surface;

inserting the porous wick into the interior cavity and optionally chemically or mechanically bonding the porous wick to the inner surface;

introducing the phase-change heat-transfer material, in solid and/or liquid form, into the interior cavity; and sealing (e.g., hermetically sealing) the interior cavity to obtain a leading-edge heat pipe.

The order of steps in the method may be varied. For example, the phase-change heat-transfer material may be introduced into the interior cavity prior to inserting the porous wick, after inserting the porous wick, or simultaneously with inserting porous wick into the interior cavity. The phase-change heat-transfer material may be introduced after sealing the interior cavity, provided there is a suitable valve or other input means (which may be mechanical, chemical, electrochemical, etc.) to enable feeding the phase-change heat-transfer material into the sealed cavity.

In some embodiments, the porous wick has a bimodal pore distribution comprising an average capillary-pore size from about 0.2 microns to about 200 microns and an average high-flow pore size from about 100 microns to about 2 millimeters, wherein the average high-flow pore size is greater than the average capillary-pore size.

In some methods, additive manufacturing comprises first generating a wick preform from a preceramic polymer, and then thermally converting the wick preform to generate the porous wick.

In some methods, the leading-edge heat pipe is integrated within a hypersonic vehicle. At a later time, the hypersonic vehicle may be operated at hypersonic speed, wherein the leading-edge heat pipe transfers thermal energy with a heat flux of about 500 W/cm$^2$ or greater.

Other variations provide a leading-edge heat pipe porous wick fabricated from a ceramic or metallic wick material, wherein the porous wick has a radius of curvature of less than 12 mm (e.g., less than 6 mm or less than 3 mm), wherein the porous wick has a bimodal pore distribution comprising an average capillary-pore size from about 0.2 microns to about 200 microns and an average high-flow pore size from about 100 microns to about 2 millimeters, and wherein the average high-flow pore size is greater than the average capillary-pore size.

Other variations provide a method of using a leading-edge heat pipe, the method comprising operating a hypersonic vehicle that integrally contains at least one leading-edge heat pipe, wherein the leading-edge heat pipe transfers heat with a heat flux of about 400 W/cm$^2$, 500 W/cm$^2$, 600 W/cm$^2$, 700 W/cm$^2$, 800 W/cm$^2$, 900 W/cm$^2$, 1000 W/cm$^2$, 1500 W/cm$^2$, 2000 W/cm$^2$, 2500 W/cm$^2$, or greater.

DETAILED DESCRIPTION OF EMBODIMENTS OF THE INVENTION

Figure 1:
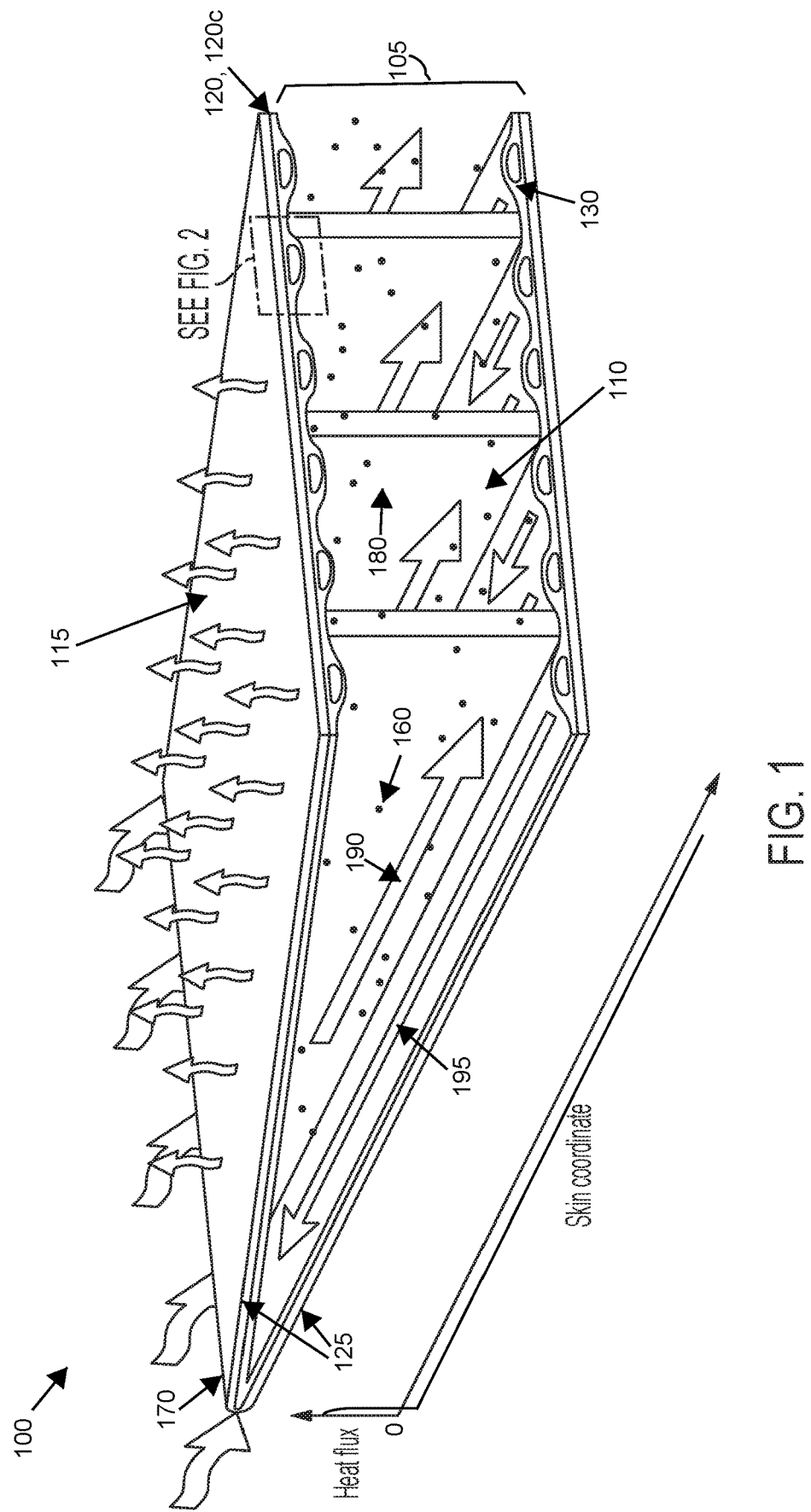
FIG. 1 is schematic drawing of an exemplary leading-edge heat pipe, in some embodiments of the invention.

The structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide a device designed to survive the high heat fluxes and extreme environmental conditions at the leading edge of a hypersonic vehicle. The purpose is to enable faster, more-maneuverable, lower-altitude, and/or longer-range hypersonic flight. However, the device is not limited by the flight speed, i.e. the device is not necessarily operated at hypersonic speed.

The goals of faster, more-maneuverable, lower-altitude, and/or longer-range hypersonic vehicles can be realized with a sharp leading edge that can accommodate high heat fluxes. Sharp leading edges enable faster speeds and enhanced maneuverability, as well as longer ranges for a given amount of fuel, due to decreased drag. Because drag is reduced with sharp leading edges, it becomes possible to operate at lower altitudes that have higher free-stream air densities. However, without the ability to transport high heat fluxes away from the stagnation point(s), the benefits of a sharp leading edge cannot be realized because the temperature would become too high— causing material deformation or even catastrophic failure due to vaporization, melting, undesirable chemical reactions, or excessive thermomechanical stresses. Despite decades of research, heretofore no one has managed to create such a hypersonic leading edge with the ability to passively transport such high heat fluxes. This disclosure therefore satisfies a long-felt need.

Some variations of this invention provide a leading-edge heat pipe containing an oxidation-resistant, high-temperature aeroshell combined with an additively manufactured, high-temperature, porous wick. An additively manufactured porous wick enables a sharper leading edge. An additively manufactured porous wick also enables increased heat rejection and consequently higher stagnation-point heat flux. The dual design criteria—sharper leading edge and high heat flux—contained in the leading-edge heat pipe allows hypersonic vehicle operation at faster speeds and/or at higher free-stream air densities, compared to a hypersonic vehicle without the disclosed leading-edge heat pipe. In particular, an additively manufactured high-temperature wick enables (a) physical conformality inside a sharp (small radius) leading edge and (b) an arterial wick with a bimodal pore distribution that simultaneously provides high capillary pressure, high liquid permeability, and high boiling limit. "Conformality" means that the wick material physically conforms to contours inside the leading edge.

Some variations of the invention will now be further described in reference to the accompanying drawings, which will be understood to be exemplary and non-limiting. The drawings are not drawn to scale.

FIG. 1 is schematic drawing of an exemplary leading-edge heat pipe 100, in some embodiments. The dotted-box inset of FIG. 1 refers to FIG. 2, which is a schematic drawing of a porous wick, viewed in the direction of the skin coordinate depicted in FIG. 1.

The leading-edge heat pipe 100 includes an envelope 105 that encloses an interior space 110. The envelope 105 has a thickness that increases with distance from edge 170. In profile the leading-edge heat pipe 100 has a wedge shape with a rounded apex end. The envelope 105 includes an outer surface 115 and an inner surface 120 (also see inner surface 420 in FIG. 4A). The inner surface 120 is in contact with interior space 110, either directly or indirectly. Indirect contact between the inner surface 120 and the interior space 110 may occur when the inner surface 120 is partially or completed coated with an inner coating 120c. Also, indirect contact between the inner surface 120 and the interior space 110 may occur for portions of the inner surface 120 onto which are disposed a porous wick 130. In FIG. 1, substantially all of the interior space 110 has a porous wick 130 disposed onto the two boundary surfaces defined by the wedge.

The outer surface 115 is part of an outer shell that interfaces with the environment. The outer shell is made from a high-temperature material that can reach sufficiently high temperatures for effective radiative cooling. Ideally, the outer shell is sufficiently thick to handle the loads of hypersonic travel, while sufficiently thin (such as less than a few millimeters) to mitigate the development of a thermal gradient across the thickness and concomitant thermal stresses.

Figure 2:
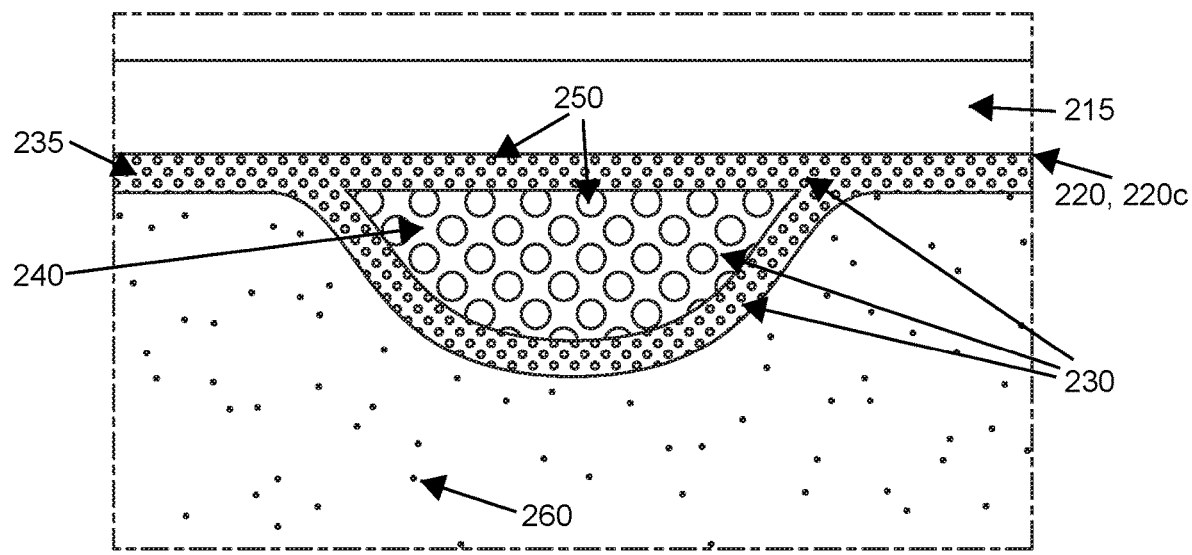
FIG. 2 is a schematic drawing of a porous wick, viewed in the direction of the skin coordinate depicted in FIG. 1.

A working fluid (also referred to herein as a phase-change heat-transfer material) is contained entirely inside (hermetically sealed within) the interior space 110. The working fluid preferably has a high vapor pressure at the operating temperature of interest, a high latent heat of evaporation, and a low propensity to react with other materials. The working fluid may exist in liquid, vapor, and/or solid forms, depending in which region(s) of leading-edge heat pipe 100 the working fluid is contained, and the state of operation of the leading-edge heat pipe 100, including the working temperature. In reference to FIG. 1, only the working fluid 160 (as a vapor phase outside the porous wick 130) is shown. In FIG. 2, when the working fluid is in the pores, it is fluid 250 (e.g., condensed liquid) and when the working fluid is outside the pores, it is fluid 260 (at least some vapor).

In FIG. 1, arrows 190 depict the direction of travel of vapor. Arrows 195 depict the direction of travel of liquid. The leading-edge heat pipe 100 can be loaded by introducing the working fluid in liquid or solid form at low temperature, or by introducing the working fluid as a vapor and then condensing it into a liquid or solid. The leading-edge heat pipe 100 is then sealed (which may be a permanent seal). When the leading-edge heat pipe 100 is heated to its operation temperature, some of the liquid or solid original load will be vaporized.

In some embodiments, the working fluid comprises Li, Na, Zn, Ag, K, Cs, an alloy thereof, or a combination of the foregoing. These elements have melting temperatures less than 1000° C. and vaporization temperatures (boiling points) in the range of about 600-2200° C., which is a typical range of working temperatures for the leading-edge heat pipe 100. Other elements or compounds (e.g. metal alloys) may be used as phase-change heat-transfer materials if they are capable of forming a vapor at a working temperature, and if they are sufficiently unreactive with other components of the leading-edge heat pipe 100. Also, additives may be included in the working fluid. Exemplary working-fluid additives include water scavengers or oxygen scavengers to prevent undesired chemical reactions, viscosity modifiers, and density modifiers, for example.

The inner coating 120c may include one or more regions (e.g., parallel to the outer surface 115) and/or one or more layers (e.g., perpendicular to the outer surface 115).

In some embodiments, the inner coating 120c contains a refractory metal, such as tungsten, molybdenum, rhenium, niobium, tantalum, iridium, rhodium, ruthenium chromium, an alloy thereof, or a combination of the foregoing. In some embodiments, the inner coating 120c contains a nickel alloy or nickel superalloy. In some embodiments, the inner coating 120c contains an intermetallic and/or a ceramic material.

The inner coating 120c may be applied by one or more of the following techniques: electroplating, electroless deposition, chemical vapor deposition, physical vapor deposition, atomic layer deposition, plasma spray, vacuum plasma spray, slurry coating. Combinations may be used, either simultaneously or sequentially. A heat treatment may be used to relieve residual stress developed during application of the inner coating 120c.

The inner coating 120c, or the innermost layer (farthest from the outer surface 115) of the inner coating 120c when it contains multiple layers, may be selected for chemical compatibility with the working fluid. A material is compatible with the working fluid if the material does not appreciably chemically react with the working fluid, dissolve in the working fluid, or dissolve the working fluid.

The inner coating 120c, or the innermost layer (farthest from the outer surface 115) of the inner coating 120c when it contains multiple layers, may be selected such that it is wet by the working fluid. "Wet" means that the working fluid has a low contact angle on the inner coating 120c, i.e. a contact angle less than 90°, preferably less than 60°, more preferably less than 30°, and most preferably about 10° or less.

The inner coating 120c, or the innermost layer (farthest from the outer surface 115) of the inner coating 120c when it contains multiple layers, may be selected to have a low vapor pressure at the working temperature. A low vapor pressure is preferably less than $10^{-4}$ Torr, more preferably less than $10^{-6}$ Torr, even more preferably less than $10^{-8}$ Torr, and most preferably less than $10^{-10}$ Torr at the working temperature, e.g., at one or more temperatures selected from about 600° C. to about 2000° C.

The inner coating 120c, or the innermost layer (farthest from the outer surface 115) of the inner coating 120c when it contains multiple layers, may be selected for strain compatibility. Selecting for strain compatibility may include a coefficient of thermal expansion (CTE) gradient approach, wherein the inner coating 120c, or its innermost layer, has a CTE intermediate between the outer surface 115 and the porous wick 130. Selecting for strain compatibility may include a strain isolator approach, wherein the inner coating 120c, or its innermost layer, has a high compliance. A high compliance may be accomplished by using a material with a low elastic modulus or through the inclusion of a porous material (e.g., a foam) with a low effective modulus. A combination of the CTE gradient and strain isolator approaches may be used.

The envelope 105 includes at least one edge 170 (preferably a leading edge), which generally has two radii of curvature of the outside surface, in the direction away from the leading-edge heat pipe 100. The edge 170 may be a tip when the two radii of curvature are equal or approximately equal. The sharpness of the edge is defined by the smaller radius of curvature. The larger radius of curvature typically is much higher than the smaller radius of curvature. The larger radius of curvature is along the edge; for example, instead of a flat edge, the edge may bend back slightly at the corners. For convenience, for an arbitrary edge, the "radius of curvature" herein will be understood to be the smallest radius of curvature in the direction away from the leading-edge heat pipe 100 (radius direction from center of curvature to circumference of the circle completing the curve). The radius of curvature is preferably less than 12 mm, more preferably less than 6 mm, and most preferably less than 3 mm, such as about, or at most about, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 millimeters, including all intervening ranges (e.g., 1.0-2.9 mm, 0.1-2.5 mm, etc.).

The envelope 105 may be in the shape of a wedge or a cone, for example. Typically, the envelope 105 gets thicker with increasing distance from the edge 170. The envelope 105 thickness may increase linearly with distance from the edge 170, or non-linearly, such as with a curved (e.g., aerodynamically designed) envelope 105. The angle of increase (i.e., angle defined by regions of outer surface 115 meeting at edge 170) may be from about 1° to about 45°, such as from about 5° to about 20°.

In some embodiments, the edge 170 comprises a carbon-carbon (C/C) composite. In some embodiments, the edge 170 comprises a ceramic matrix composite, such as (but not limited to) C/SiC or SiC/SiC. Alternatively, or additionally, the edge 170 may contain a refractory metal or metal alloy, such as tungsten, molybdenum, rhenium, niobium, tantalum, iridium, rhodium, ruthenium chromium, an alloy thereof, or a combination of the foregoing. In certain embodiments, the edge 170 is coated on its outside surface by an anti-oxidation coating designed to reduce the rate the rate of oxidation of the underlying material of the edge 170. The anti-oxidation coating may contain, for example, SiC, HfC, TaC, $HfB_2$, $HfTaB_2$, $HfO_2$, $Si_3N_4$, Ir, Re, or a combination thereof.

The envelope 105 includes at least one heat-rejection surface. In the variation depicted in FIG. 1, the heat-rejection surface is the outer surface 115. The heat-rejection surface may be a different surface than the outer surface 115, but it is not exclusively the edge 170 (noting that the edge 170 will reject some heat via radiation). In some embodiments, the heat-rejection surface contains a carbon-carbon composite, a ceramic matrix composite, a refractory metal or metal alloy, or a combination thereof. In certain embodiments, the heat-rejection surface may be coated on its outside surface (in the direction away from the leading-edge heat pipe 100) by an anti-oxidation coating designed to reduce the rate the rate of oxidation of the underlying material. The anti-oxidation coating for the heat-rejection surface, when present, may contain SiC, HfC, TaC, $HfB_2$, $HfTaB_2$, Ir, Re, or a combination thereof, for example. In these or other embodiments, the heat-rejection surface may be coated on its outside surface with a high-emissivity material designed to increase radiative heat rejection. The high-emissivity material may have an emissivity of at least 0.9, 0.95, or 0.99, and may comprise carbon or a ceramic matrix composite, for example.

Figure 5:
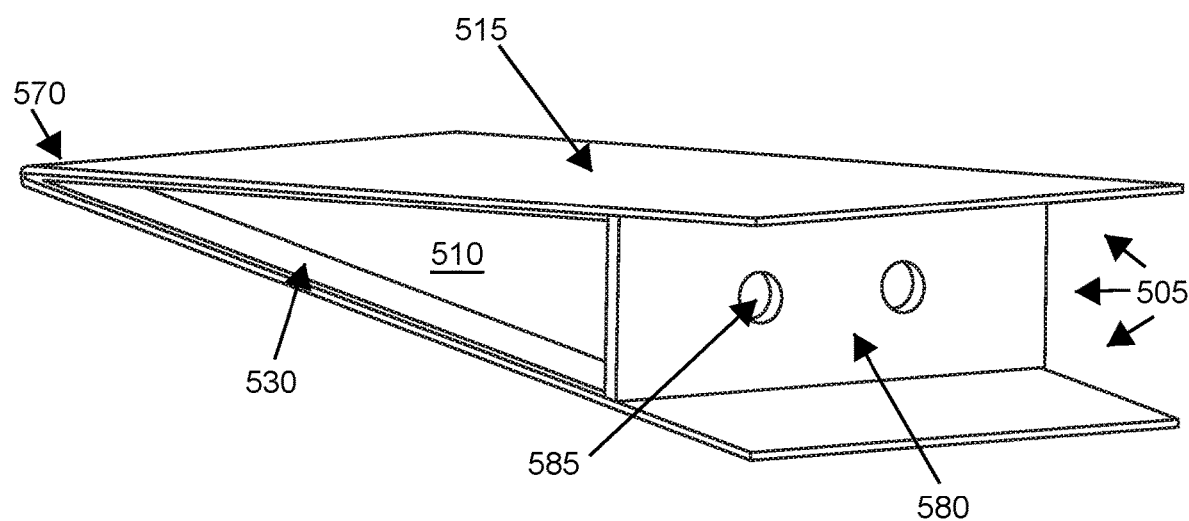
FIG. 5 depicts a portion of envelope, porous wick, outer surface, and solid back wall (e.g., 3D-printed ceramic) with holes (ports).
Figure 6A:
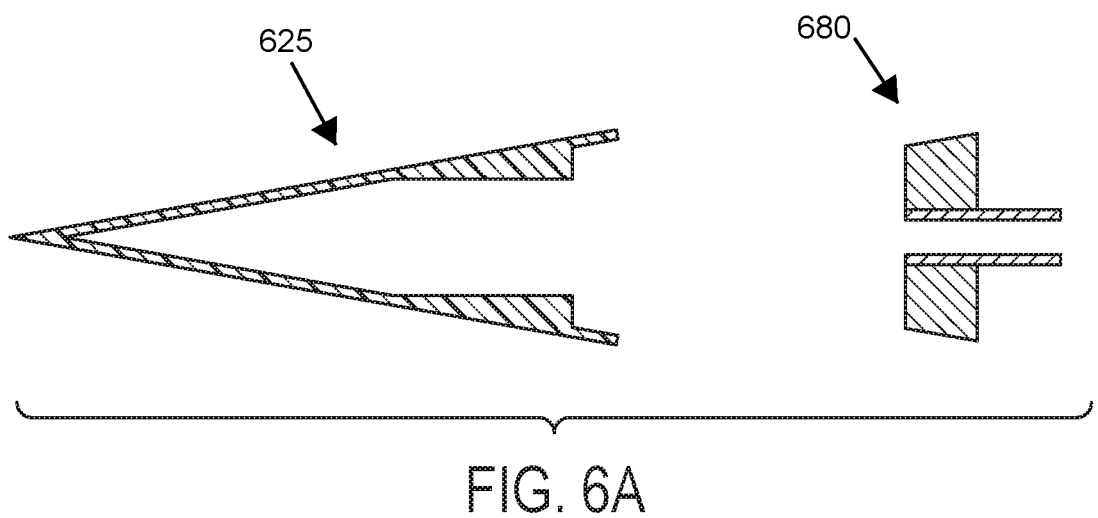
FIG. 6A depicts the fabrication of a leading-edge heat pipe and an end cap, in some embodiments.
Figure 6B:
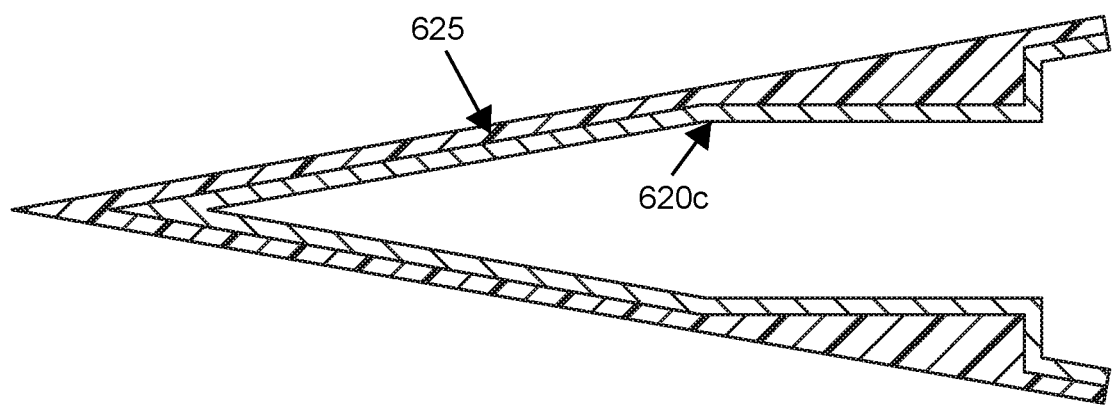
FIG. 6B depicts the addition of an internal coating on the aeroshell, in some embodiments.

As depicted in FIG. 5, the envelope 505 of leading-edge heat pipe 500 may include an aft surface 580 which is neither the heat-rejection surface 515 nor the edge 570. Note that aft surface 580 is "aft" relative to the position of the edge 570, but is not necessarily aft relative to the entire hypersonic vehicle. The envelope 105 may completely enclose the interior space 110, as shown in FIGS. 5 and 6D, when an aft surface 580 is present in the leading-edge heat pipe 100.

The aft surface 580 may contain a carbon-carbon composite, a ceramic matrix composite, a refractory metal or metal alloy, or a nickel alloy or superalloy, for example. Preferably, the aft surface 580 comprises a refractory metal. The aft surface 580 may contain tungsten, molybdenum, rhenium, niobium, tantalum, iridium, rhodium, ruthenium chromium, an alloy thereof, or a combination of the foregoing, for example. The aft surface 580 may be coated on its outside surface (in the direction away from the interior space 510) by an anti-oxidation coating (e.g., SiC and/or HfC) designed to reduce the rate of oxidation of the underlying material of the aft surface 580. The aft surface 580 may be joined to the rest of the envelope 505 by welding, brazing, diffusion bonding, chemical vapor deposition, chemical vapor infiltration, atomic layer deposition, mechanical fastening, or a combination thereof, for example.

The envelope 105 may include one or more materials in different regions, as noted above as well as in additional regions that may be present.

For any region containing a carbon-carbon composite, such carbon-carbon composite may be carbon fibers in a matrix of graphite or graphene, for example. For any region containing a ceramic matrix composite, such ceramic matrix composite may include a carbon phase, a silicon carbide (SiC) phase, or both of these. For any region containing a metal matrix composite, such metal matrix composite may include a carbon phase, a silicon carbide (SiC) phase, or both of these.

For any region containing a refractory metal alloy, such metal alloy may include C103, TZM, T111, T222, Mo—Re, or a combination thereof, for example.

For any region containing a nickel alloy or superalloy, such alloy or superalloy may include Haynes 230, 263, Hastelloy X, Rene 220, Inconel 625, 713C, 718, 738LC, 792, Mar-M-247, or a combination thereof, for example.

A porous wick 130 is configured entirely inside the interior space 110. The porous wick 130 is a structure with interconnected pores, in which fluid can flow from one pore to another pore. The porous wick 130 is in contact with the outer shell, so that when the working fluid condenses on the wick, the released heat is easily transferred to the outer shell for radiative cooling (depicted in FIG. 1 as the arrows pointing upward from outer surface 115). The porous wick 130 is configured so that the working fluid is rapidly transported back to the location of highest heat flux. The porous wick 130 is fabricated from a high-temperature material, to ensure thermal stability. The material of the porous wick 130 is preferably compatible with both the inner surface 120 (or its coating 120c) and the working fluid across the temperature range of exposure. The porous wick 130 has a high permeability for good fluid flow, while having fine pores near the gas/liquid interface to increase the capillary pressure which drives flow.

At least some regions of the porous wick 130 are adjacent to the inner surface 120 of the envelope 105, or a coated version thereof. Preferably, all regions of the inner surface 120 are adjacent to at least some of the porous wick 130. Some or all regions of the porous wick 130 preferably are in physical contact with, and conforming to, the inner surface 120 of the envelope 105. Some or all regions of the porous wick 130 may be mechanically joined to the inner surface 120 of the envelope 105.

The porous wick 130 may be defined by a thickness from the inner surface 120. The thickness of the porous wick 130 may be uniform throughout the interior space 110. In some embodiments, the thickness of the porous wick 130 varies in different regions within the interior space 110. The porous wick 130 may be as thin as 0.01 mm. In some embodiments, the porous wick 130 is from about 0.1 mm to about 10 mm in thickness, such as from about 0.4 mm to about 3 mm in thickness.

Preferably, the porous wick 130 contains thicker wick regions and thinner wick regions. In these embodiments, at its thickest location, it is preferred that the porous wick 130 is less than 10 mm thick and more preferably less than 5 mm thick. At its thinnest location, the porous wick 130 should be sufficiently thin to conform to the cavity dimensions at the nose of the envelope 105, near the leading edge 170, in these embodiments. In these embodiments, the porous wick 130 is itself sharp at the leading edge 170.

The porous wick 130 does not occupy all of the interior space 110. However, near the edge 170, the porous wick 130 may be as thick as the cavity between the inner wall surfaces of envelope 110 (i.e., the porous wick 130 spans the full height of the wedge). The fill factor of the porous wick 130 may be from about 0.1 vol % to about 10 vol %, for example, based on the total volume of the interior space 110. Near the edge 170, such as within 1%, 2%, 5%, or 10% of the skin coordinate dimension of FIG. 1, the fill factor of the porous wick 130 may be from about 1 vol % to 100 vol %, e.g. about 5 vol %, 10 vol %, 20 vol %, 30 vol %, 40 vol %, 50 vol %, 60 vol %, 70 vol %, 80 vol %, 90 vol %, 95 vol %, 99 vol %, or 100 vol %.

The porous wick 130 contains interconnected pores (i.e., open porosity) with a porosity ranging from about 25% to about 95%, for example. In various embodiments, the average porosity of the porous wick 130 may be about 25%, 30%, 40%, 50%, 60%, 70%, 80%, 90%, or 95%.

The average diameter of the pores in the porous wick 130 may be from about 0.2 µm to about 2 mm. In various embodiments, the average pore diameter of the porous wick 130 pores may be about 0.2, 0.5, 1, 2, 5, 10, 25, 50, 100, 150, 200, 500, 1000, 1500, or 2000 µm.

The porous wick 130 may include a homogenous pore size or a distribution of pore sizes. Pores may be any number of shapes, such as approximately circular as shown in FIG. 2, approximately square as shown in FIG. 3D, rectangular, triangular, oval, or random. Pores may be formed from the interstitial regions between partially sintered spheres. The porous wick 130 may include a homogenous pore shape or a distribution of pore shapes. The pores may be regularly spaced apart or irregularly (e.g., stochastically) spaced apart.

As shown in FIG. 2, in preferred embodiments of the porous wick 230, there is a bimodal distribution of pore sizes. The bimodal pore distribution arises when there are both small pores 235 for driving capillary forces as well as large pores 240 for reducing overall resistance to flow of the working fluid 250 contained in the pores. The small pores are also referred to herein as capillary pores, while the large pores are also referred to herein as high-flow pores. When there is a bimodal pore distribution, preferably it includes an average capillary-pore size (e.g., capillary diameter or effective capillary diameter) from about 0.2 microns to about 200 microns and an average high-flow pore size (e.g., hydraulic diameter or effective hydraulic diameter) from about 100 microns to about 2 millimeters. The average high-flow pore size is greater than the average capillary-pore size. In various embodiments, the hydraulic diameter of the high-flow pores may range from about 0.5 µm to about 2 mm, such as about 0.5, 1, 2, 5, 10, 25, 50, 100, 150, 200, 500, 1000, 1500, or 2000 µm. In these or other embodiments, the capillary diameter of the capillary pores may be about 0.2 µm to about 1 mm, such as about 0.2, 0.5, 1, 2, 5, 10, 25, 50, 100, 150, 200, 500, or 1000 µm. The volumetric ratio of capillary pores to high-flow pores may be about 1:1000, 1:100, 1:10, 1:1, or 10:1, for example, such as between 1:5 and 1:50.

FIG. 2 shows capillary pores 235 spatially segregated from the high-flow pores 240. Alternatively, the capillary pores 235 and high-flow pores 240 may be spatially intermixed, or there may be spatially segregated regions as well as one or more intermixed regions.

In preferred embodiments with a bimodal distribution of pore sizes and a porous wick 130 with thinner and thicker regions, the thinner wick regions contain only smaller pores, preferably smaller than 30 microns, and more preferably between 0.5 and 20 microns. In these or other embodiments, the thicker wick regions contain only larger pores, or more preferably, both smaller pores and larger pores, wherein the smaller pores have a capillary diameter preferably smaller than 30 microns, and more preferably between 0.5 and 20 microns, while the larger pores have a hydraulic diameter larger than the smaller pores and preferably at least 100 µm. It is also preferred that the larger pores are entirely contained within thicker regions of the porous wick 130, such that the thicker regions have an interior region of larger pores and an exterior region of smaller pores (see FIGS. 2 and 3B, for example).

Note that the capillary pores may themselves have a bimodal size distribution and the high-flow pores may also themselves have a bimodal size distribution. In this case, the overall porous wick 130 will have a size distribution with four modes. In some cases, the overall porous wick 130 may have a trimodal pore-size distribution, such as when one of the capillary pores or high-flow pores is bimodal.

The porous wick 130 may have regions that extend between inner-wall envelope surfaces either to provide structural support during operation or to help maintain the shape of the wick during fabrication. These wick regions may have a porosity from 0 to about 75%, for example. These wick regions may span the full length of the heat pipe or may be as small as about 0.5 mm long, for example. The cross-sectional dimension of these regions may be from about 0.5 mm to about 50 mm, for example, when such regions are present in the leading-edge heat pipe 100.

The porous wick 130 may contain or consist of pyrolytic carbon, SiOC, SiC, $Si_3N_4$, aluminum silicates (e.g., mullite), amorphous silica (e.g., fused quartz), crystalline silica, alumina, rare-earth silicate (e.g., yttrium silicate or scandium silicate), rare earth aluminate (e.g., yttrium aluminate or scandium aluminate), or a combination thereof, for example. In some embodiments, the porous wick 130 contains or consists of a wick-precursor material that is formed by pyrolysis of a polymer, such as a pre-ceramic polymer (e.g., polyphenols, polysiloxanes, polycarbosiloxanes, polycarbosilanes, polysilazanes, polyborosilanes, or polyborosilazanes).

A wick-precursor material (e.g., polymer or pre-ceramic polymer) may be patterned using additive manufacturing, such as but not limited to photolithographic vat polymerization methods, e.g. stereolithography, and digital light processing, binder jetting, or direct writing. The wick-precursor material is then converted to wick material, such as by thermal treatment (e.g., pyrolysis). A wick-precursor material may be referred to as a wick preform. Forming a porous wick by additive manufacturing can be advantageous to fabricate a sharp porous wick 130 for a sharp leading edge 170.

The wick material may be formed by the sintering of ceramic particles. In some embodiments, particles are first bound by a sacrificial resin that is subsequently burned off before sintering of the particles, as can be done with photolithographic vat polymerization methods, including stereolithography, digital light processing, binder jet printing, material jetting, and/or fused deposition molding. The initial shape of the part and/or the concentration of ceramic particles in resin matrix may dictate the final porosity of the wick. In certain embodiments, some or all of the porosity arises from the incomplete sintering of the ceramic particles.

In some embodiments, the wick material may be formed by chemical vapor deposition onto a porous scaffold. The material deposited via chemical vapor deposition may be the same as the material used for the scaffold. Alternatively, the material deposited via chemical vapor deposition may be the different than the material used for the scaffold.

The porous wick 130 may be coated with a wick coating. An optional wick coating may include refractory metals (such as tungsten, molybdenum, rhenium, niobium, tantalum, iridium, rhodium, ruthenium, or chromium) or their alloys, nickel alloys, nickel superalloys, intermetallics, ceramics, or combinations thereof. Whether or not a wick coating is desired will depend on selection of materials for the wick, the shell material, and the working fluid. For example, when the shell material is a carbon-carbon composite and the working fluid is sodium or lithium, a wick coating is preferred.

A wick coating may be applied by electroplating, electroless deposition, chemical vapor deposition, physical vapor deposition, atomic layer deposition, plasma spray, vacuum plasma spray, slurry coating, or a combination thereof, for example. Heat treatment may be used to relieve residual stress developed during application of the wick coating.

The wick coating may be in the form of one or more regions or layers. That is, multiple coating layers may be applied and/or there may be multiple regions of a coating layer having different composition, thickness, etc.

The wick coating, or its innermost layer (in the direction toward the interior space 110) when there are multiple layers, may be selected for chemical compatibility with the working fluid. Coating layers are compatible with the working fluid if the coating material does not appreciably chemically react with the working fluid, dissolve in the working fluid, or dissolve the working fluid. The innermost layer of the wick coating may be selected such that it is wet by the working fluid. "Wet" means that the working fluid has a low contact angle on the wick coating, i.e. a contact angle less than 90°, preferably less than 60°, more preferably less than 30°, and most preferably about 10° or less.

The wick coating, or its innermost layer (in the direction toward the interior space 110) when there are multiple layers, may be selected to have a low vapor pressure at the working temperature. A low vapor pressure is preferably less than $10^{-4}$ Torr, more preferably less than $10^{-6}$ Torr, even more preferably less than $10^{-8}$ Torr, and most preferably less than $10^{-10}$ Torr at the working temperature, e.g., at one or more temperatures selected from about 600° C. to about 2000° C.

Figure 3A:
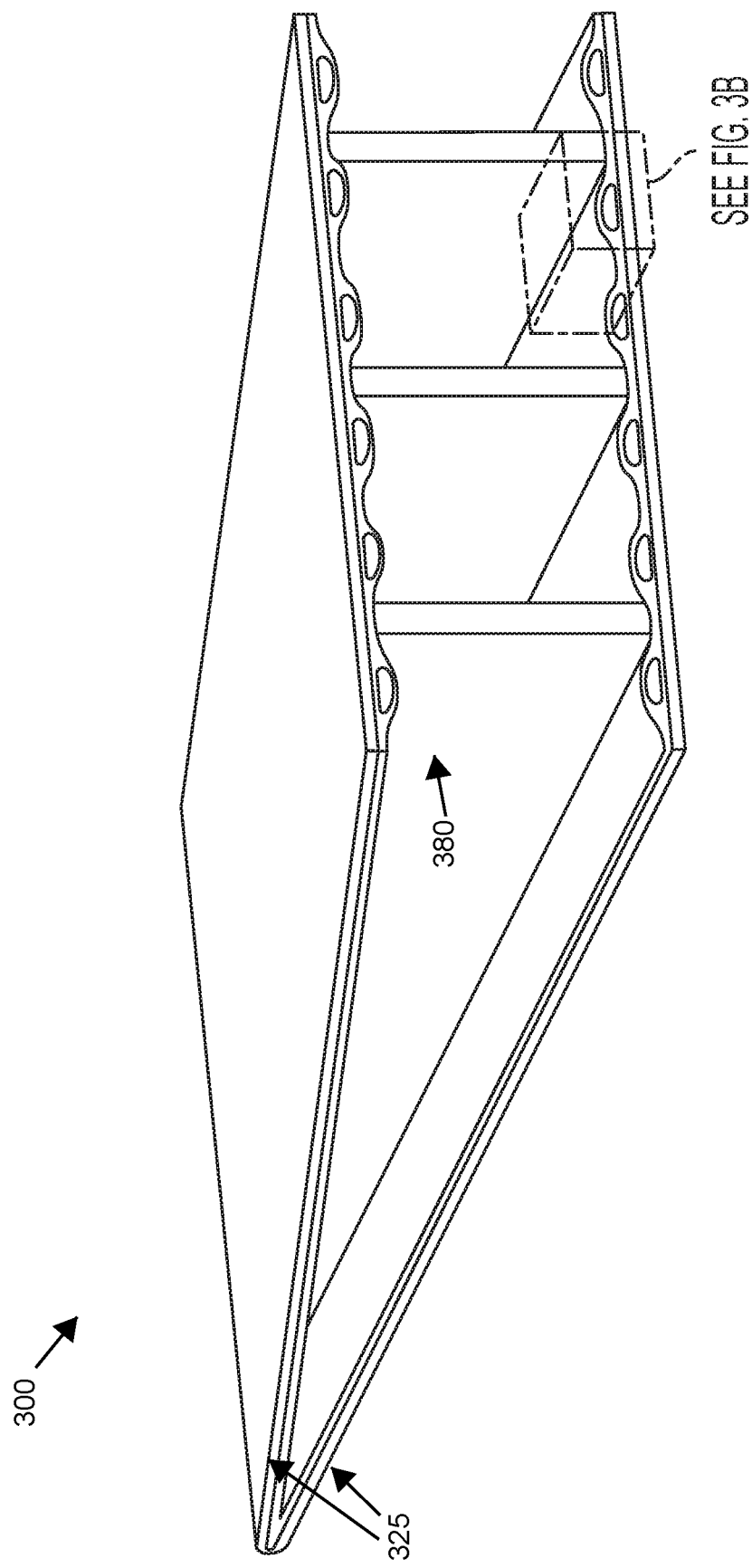
FIG. 3A is a schematic drawing of a leading-edge heat pipe, in some embodiments.
Figure 3B:
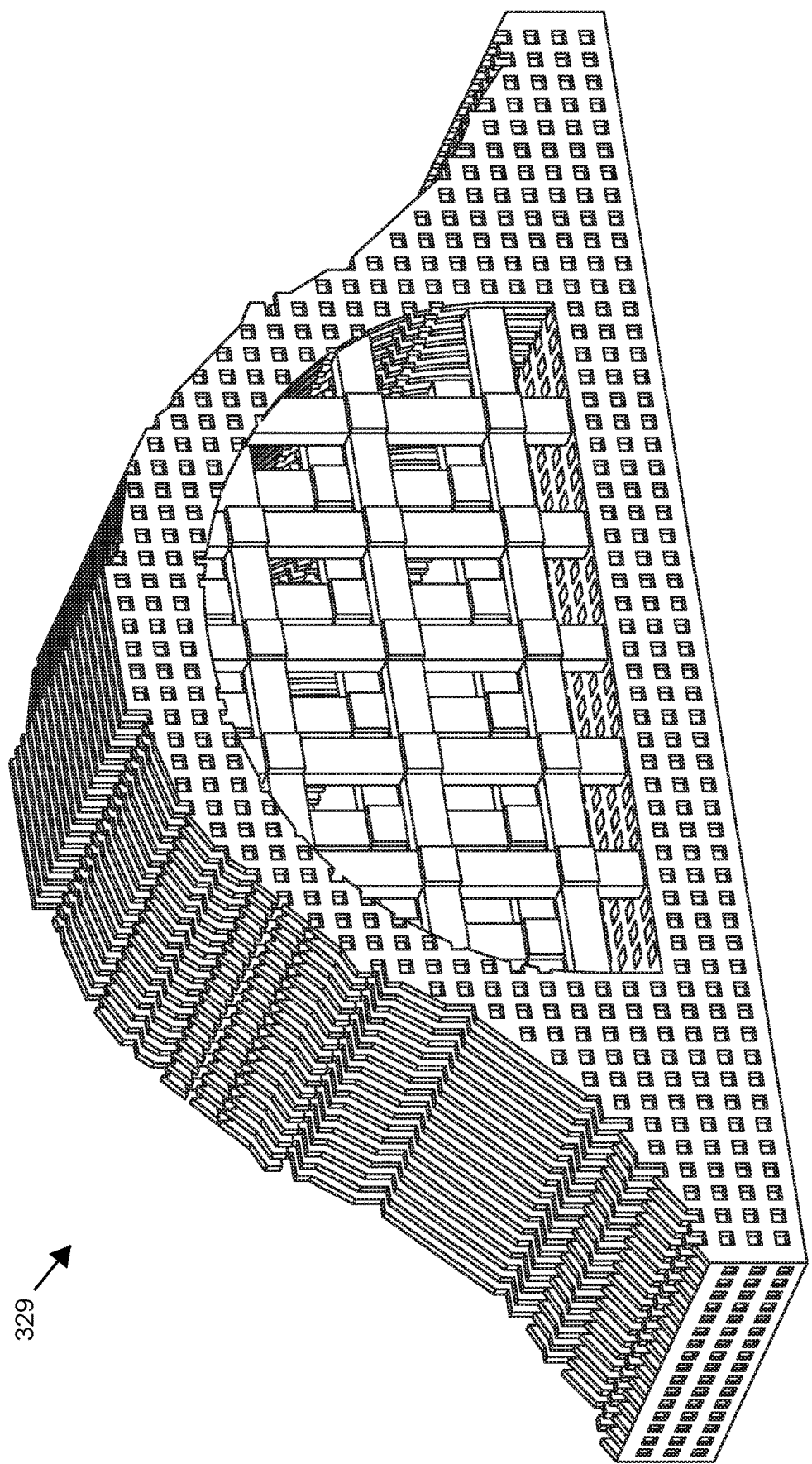
FIG. 3B is a cross section of a porous wick perform for a leading-edge heat pipe, in some embodiments.
Figure 3C:
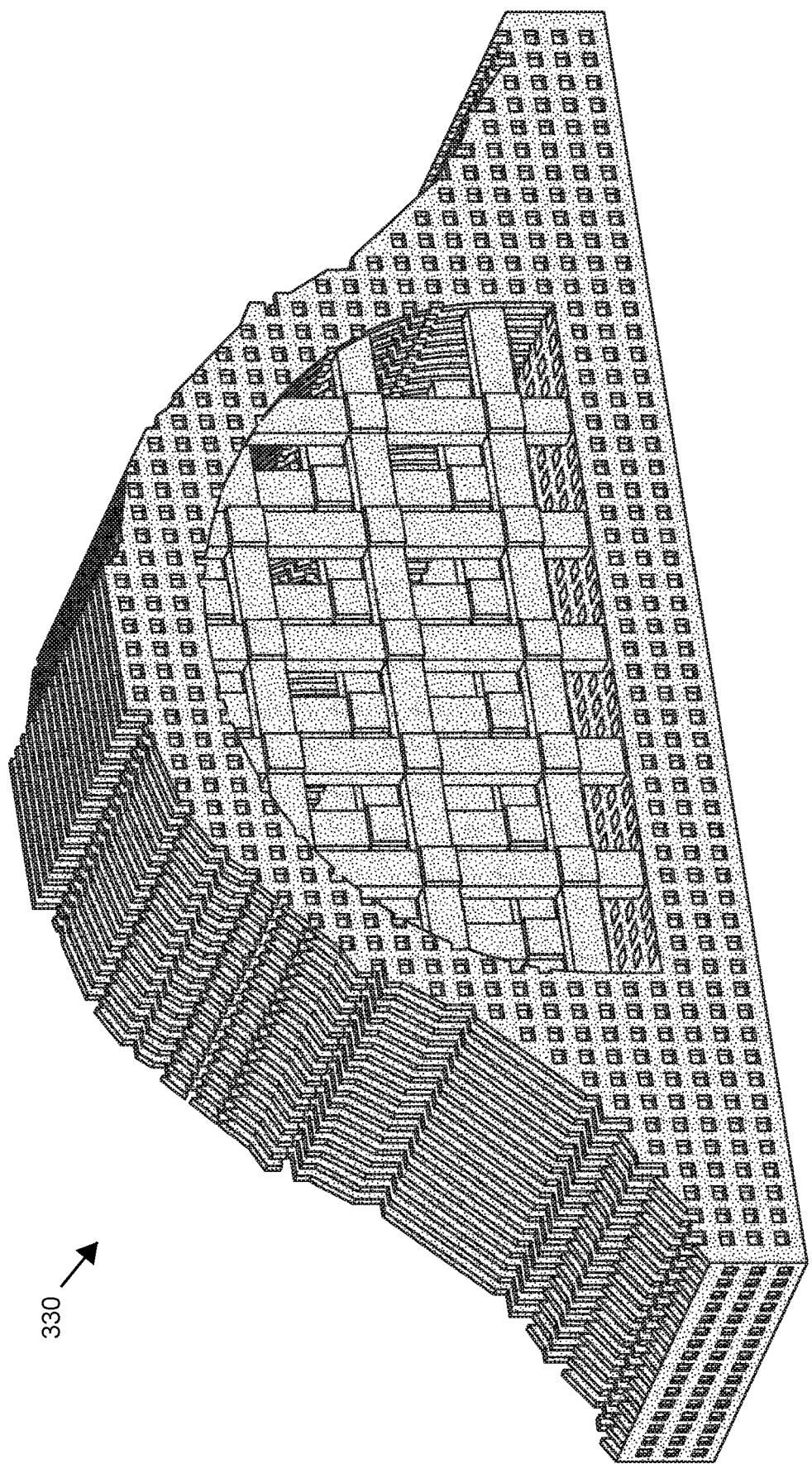
FIG. 3C is a cross section of a porous wick for a leading-edge heat pipe, in some embodiments.
Figure 3D:
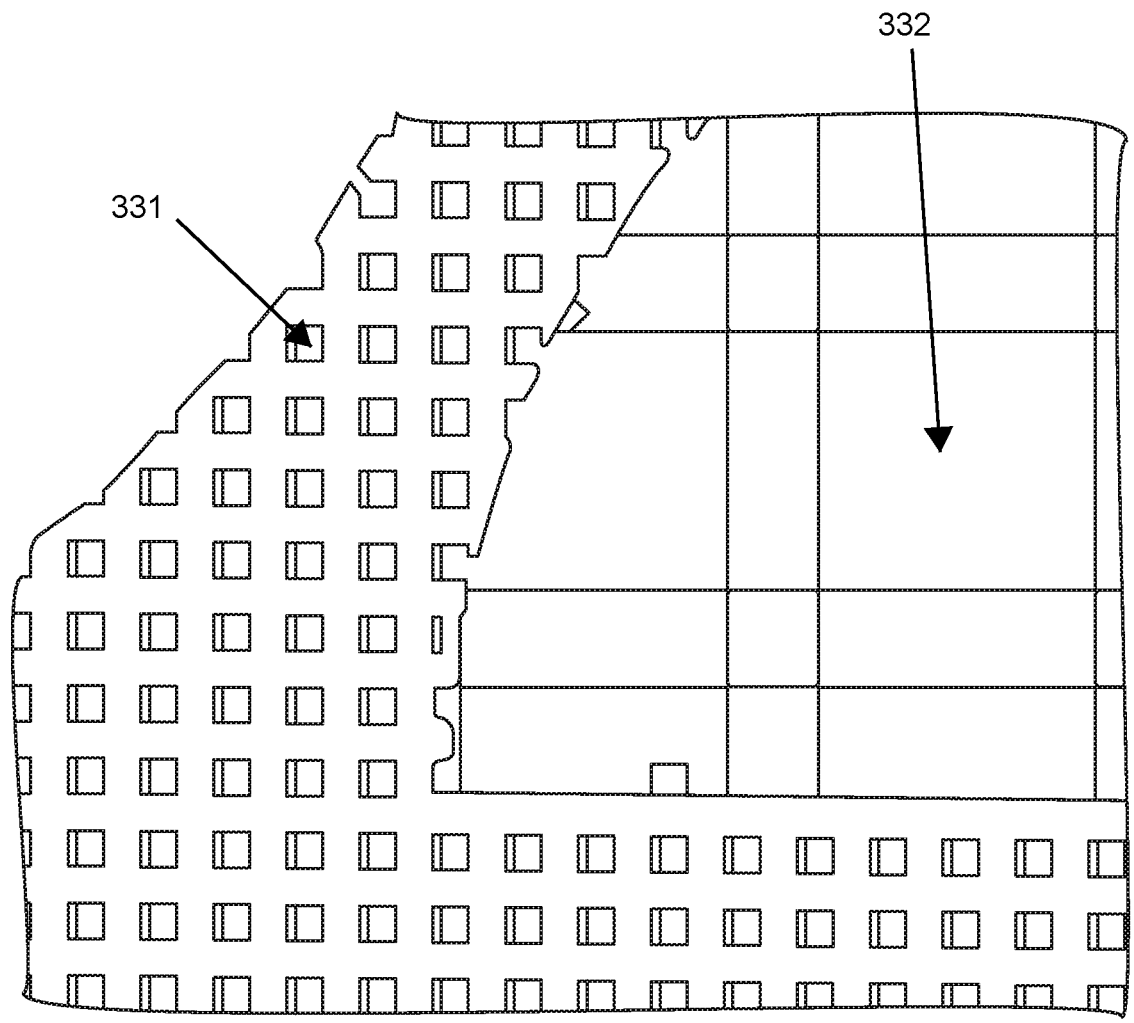
FIG. 3D is an illustration of a bimodal pore distribution for a porous wick, in some embodiments.
Figure 3E:
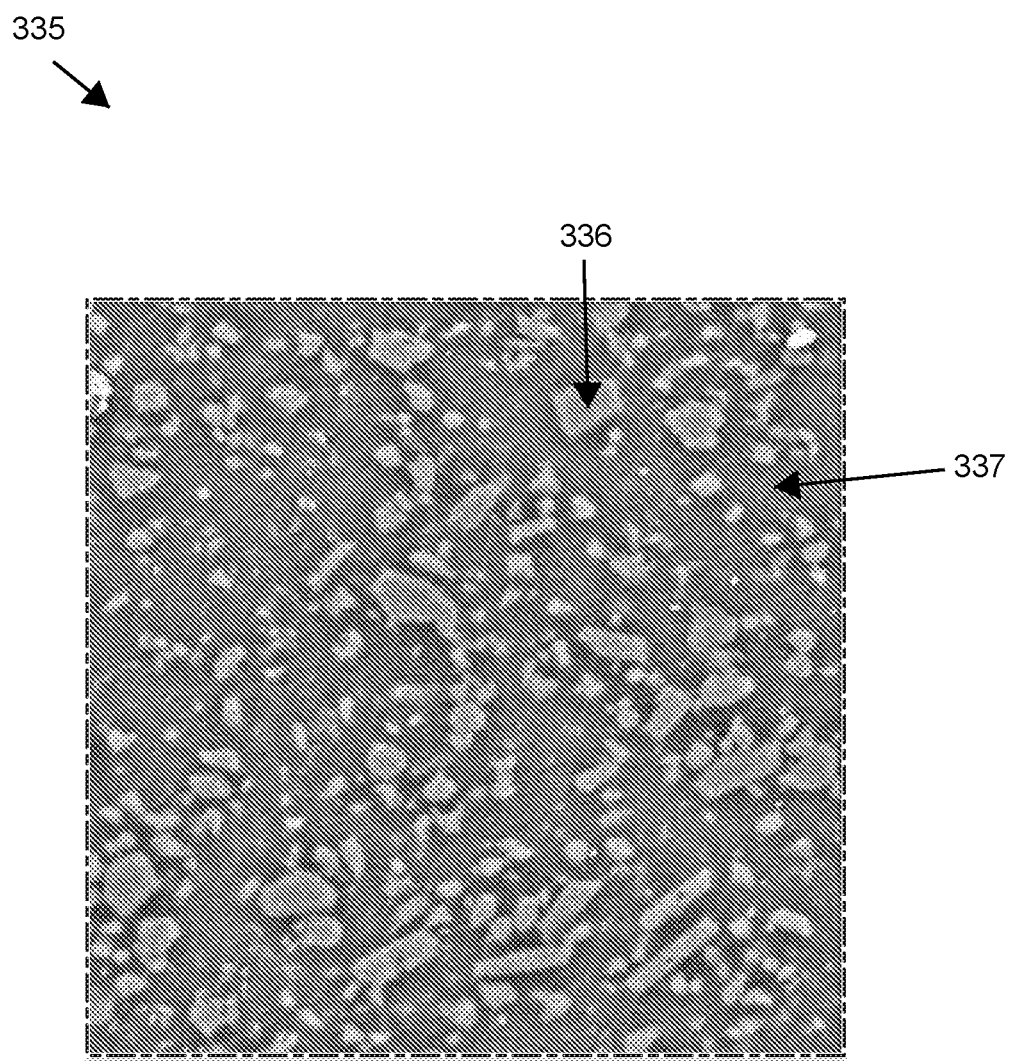
FIG. 3E is an SEM image of material contained in a ceramic porous wick produced from a preceramic polymer, in some embodiments.
Figure 4A:
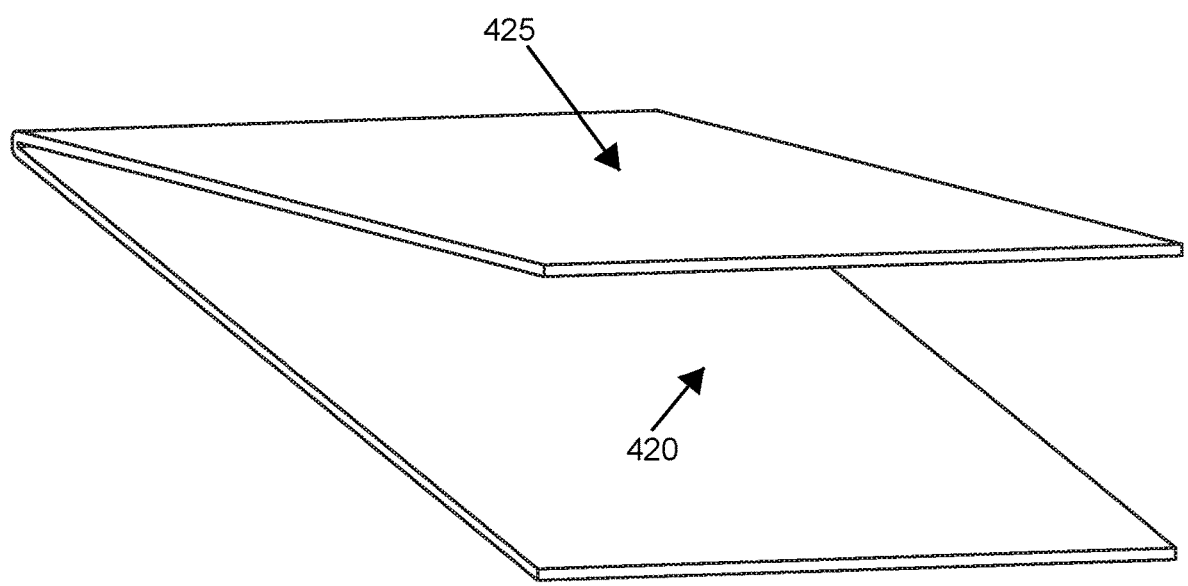
FIG. 4A depicts an aeroshell for assembling a leading-edge heat pipe, in some embodiments.
Figure 4B:
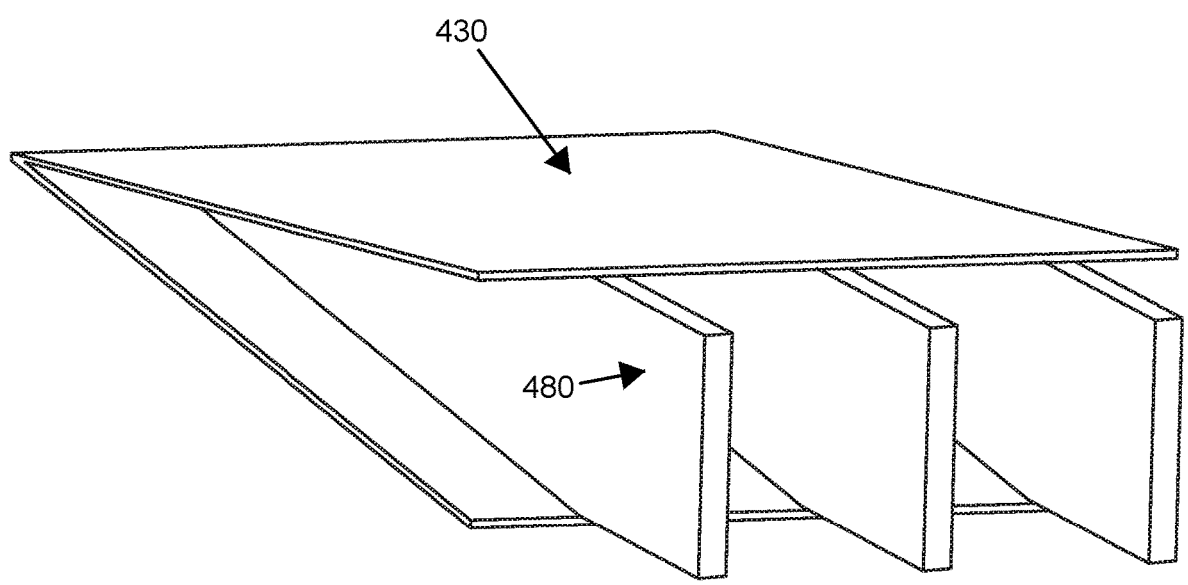
FIG. 4B depicts a porous wick and solid mechanical supports, which may be integrally additively manufactured, in some embodiments.
Figure 4C:
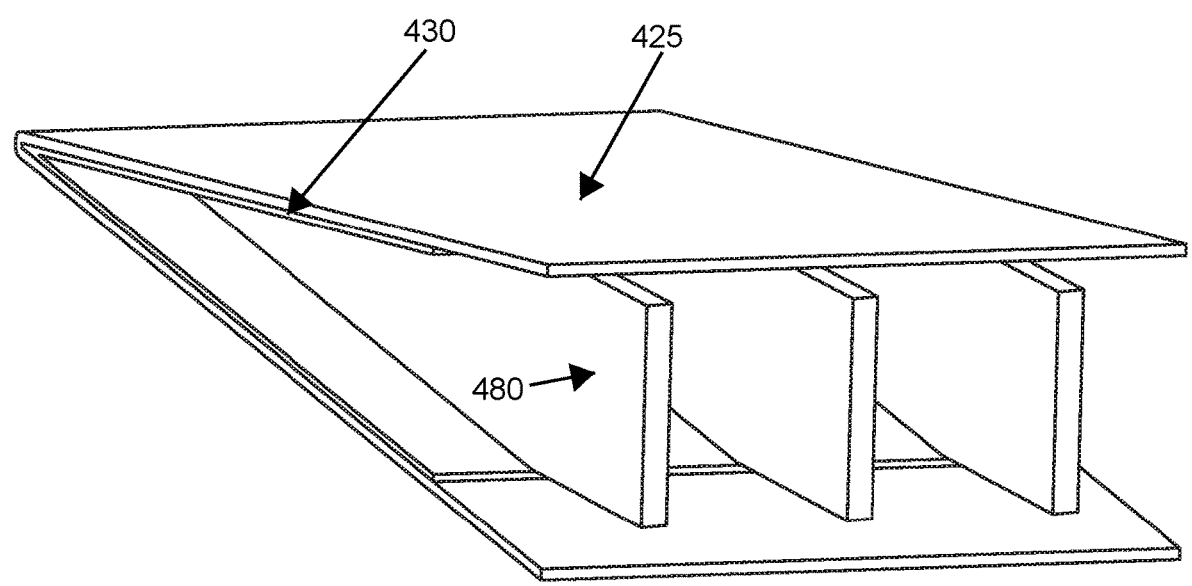
FIG. 4C depicts the placement of a porous wick into an aeroshell, in some embodiments.

In some embodiments, there are mechanical load-bearing structures 180, 380 in the interior space 110, such as depicted in FIGS. 1 and 3 (also see in mechanical load-bearing structures 480 in FIGS. 4B-4C). Exemplary mechanical load-bearing structures 180 include, but are not limited to, spars, stringers, struts, periodic lattice structures, stochastic lattice structures, or a combination thereof. The mechanical load-bearing structures 180 may contain one or more of the same materials within the envelope 105, such as the material of inner surface 120, inner coating 120c, or porous wick 130. Mechanical load-bearing structures 180 may be fabricated using the same methods as those to produce the materials within the envelope 105. In some embodiments, one or more mechanical load-bearing structures 180 are integrally fabricated with other structures within envelope 105, such as inner surface 120, porous wick 130, or aft surface 580. Mechanical load-bearing structures 180 may be coated with the same material as inner coating 120c.

In some embodiments, porous or non-porous structures may be attached to the porous wick 130 to aid the wick in maintaining its shape during assembling (see FIGS. 4A-4D), such as during fabrication, inserting, and/or bonding. The porous wick 130 may contain strain-relief features, such as one or more slits or gaps in the porous wick 130 to accommodate thermal expansion.

Figure 4D:
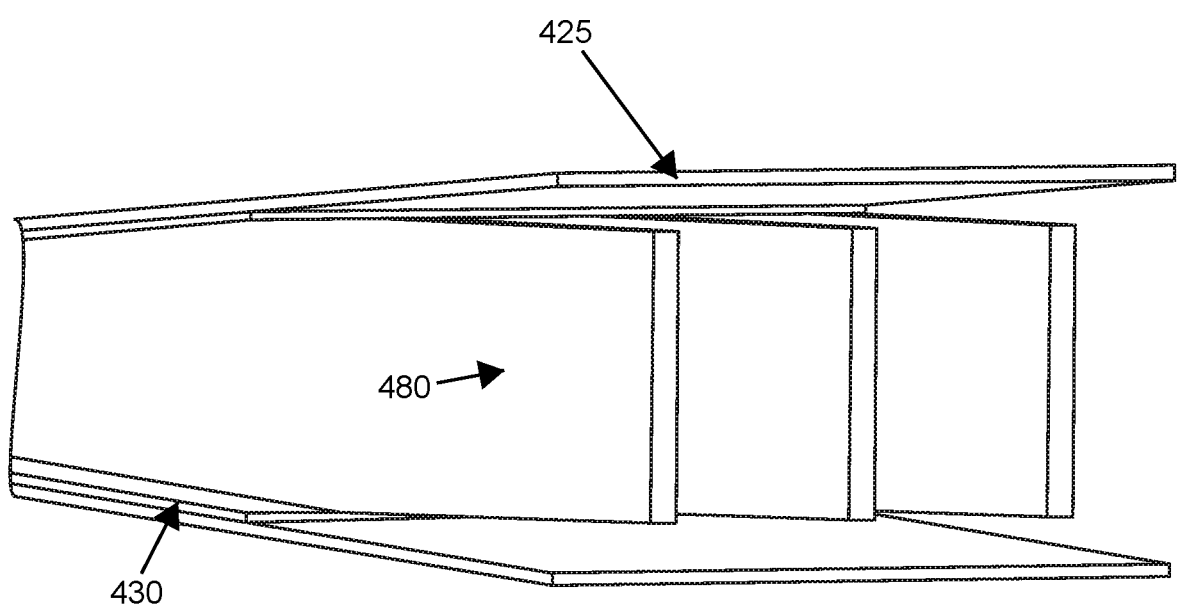
FIG. 4D depicts bonding between mechanical supports and aeroshell, with increased surface area for bonding beyond the end of the heat pipe, in some embodiments.

FIGS. 4A to 4D depict assembly of a leading-edge heat pipe 100 in some embodiments. In FIG. 4A, an aeroshell 425 (e.g., a carbon-carbon shell) is provided. In FIG. 4B, a porous wick 430 is provided, with solid mechanical supports 480, where the porous wick 430 and support structure 480 may be integrally additively manufactured SiOC, for example. In FIG. 4C, the porous wick 430 is placed within the aeroshell 425. In FIG. 4D, bonding between mechanical supports 480 and aeroshell 425 is shown, with increased surface area for bonding beyond the end of the heat pipe 430. FIG. 5 depicts a portion of envelope 505, porous wick 530, outer surface 515, and solid back wall 580 (e.g., 3D-printed ceramic) with holes (ports) 585. A similar wall may be added to the sides as well.

Some variations of the invention relate to methods to manufacture a leading-edge heat pipe. The method of making a leading-edge heat pipe 100 may include fabricating an aeroshell 125, 625 (see FIG. 6A). In some embodiments, a billet of material is fabricated or obtained, and the billet is subtractively machined into the desired shape. For example a composite material may be converted (e.g., machined) into a billet shape, followed by curing, polymer infiltration and pyrolysis cycles and/or vapor infiltration cycles. Conventional machining (e.g., milling or drilling) or electro-discharge machining may be utilized. In some embodiments, composite lay-up is performed to directly fabricate the desired shape of the aeroshell 125/625, including potentially polymer infiltration and pyrolysis cycles and/or vapor infiltration cycles. In some embodiments, the aeroshell 125/625 is additively manufactured.

The method of making a leading-edge heat pipe 100 may include coating the aeroshell 625 internally, externally, or both. In FIG. 6B, the aeroshell 625 has an internal coating 620c. For example, an anti-oxidation coating and/or a thermal barrier coating may be applied externally and/or a chemical compatibility coating may be applied internally. Aeroshell coating may be done by electroplating, electroless deposition, chemical vapor deposition, physical vapor deposition, atomic layer deposition, plasma spray, or vacuum plasma spray, for example.

The method of making a leading-edge heat pipe 100 may include fabricating a porous wick 130 via additive manufacturing following by thermal treatment. In some embodiments, a wick preform 329 (FIG. 3B) is made by additively manufacturing a wick preform, such as via ceramic stereolithography using a UV-curable acrylate-based resin with dispersed ceramic particles. See, for example, Eckel et al., U.S. Patent App. Pub. No. 2019/0002351, published Jan. 3, 2019, entitled "Photopolymer resins with solid and liquid phases for polymer-derived ceramics", which is hereby incorporated by reference herein. In some preferred embodiments, the wick preform 329 is made using additively manufacturing with a preceramic polymer, starting with a UV-curable carbosilane, silazane, or siloxane that is converted to SiC, SiCN, or SiOC by pyrolysis. In some embodiments, in reference to FIG. 3E, a UV-curable preceramic resin 329 may be filled with ceramic particles and/or whiskers 328. Optionally, sacrificial particles are incorporated into the wick preform 329, to enable the generation of fine pores upon thermal treatment. For example, sacrificial particles such as organic polymer particles may be added to the resin. The polymer particles are then burned out during pyrolysis, leaving behind fine pores that may form part or all of the capillary pores described earlier. After pyrolysis or other thermal treatment of the wick preform 329, the pyrolyzed wick may then be coated with a wick coating (described above), if desired, to produce the porous wick 330 (FIG. 3B). The porous wick 330 includes capillary pores 331 and larger high-flow pores 332 (FIG. 3D).

FIGS. 3A to 3E collectively demonstrate the 3D printing of a porous wick for a leading edge heat pipe 300 in FIG. 3A. The cross section of the porous wick is shown in FIGS. 3B and 3C, and its bimodal pore distribution (331/332) is shown in FIG. 3D, starting from a preceramic polymer. After 3D printing, the wick preform 329 (FIG. 3B) is thermally treated to convert the polymer to a ceramic porous wick 330 (FIG. 3C). As shown in FIG. 3E, the preceramic polymer 337 is filled with ceramic particles 336, thereby creating a reinforced ceramic matrix composite 335 after pyrolysis to fabricate a ceramic porous wick 330. The ceramic matrix composite 335 of FIG. 3E is a zoomed-in version of an arbitrary region of material of the ceramic porous wick 330 of FIG. 3C.

The method of making a leading-edge heat pipe 100 may include fabricating an end cap 580, 680 (FIGS. 5, 6A, 6D) that may function as an aft surface. In some embodiments, the end cap 580, 680 includes one or more holes 585, such that a tube 690 (or multiple tubes) may be inserted through the end cap 580. The end cap 580 may be made by additive manufacturing, conventional subtractive machining, brazing, welding, diffusion bonding, electro-discharge machining, or a combination thereof.

Figure 6C:
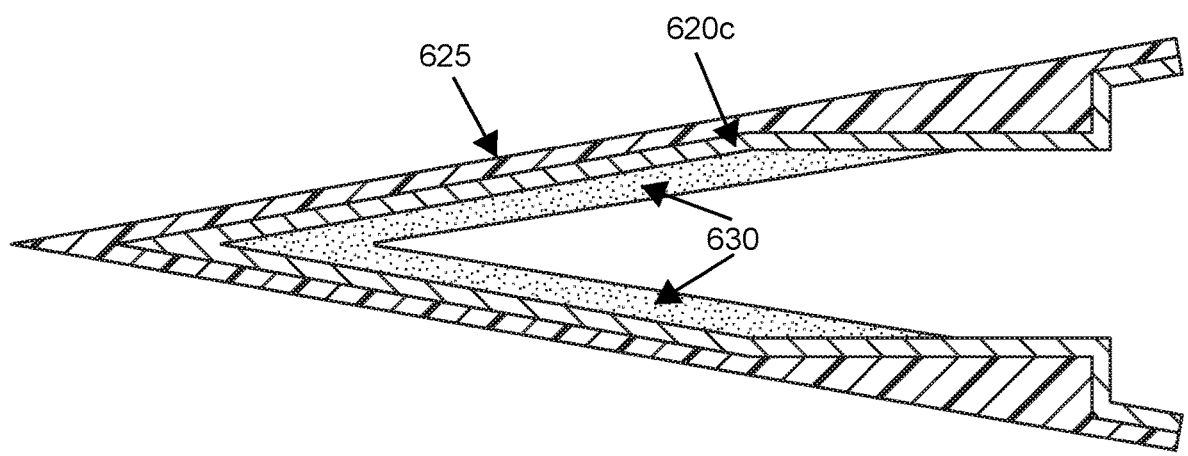
FIG. 6C depicts the insertion of the porous wick into the aeroshell, in some embodiments.
Figure 6D:
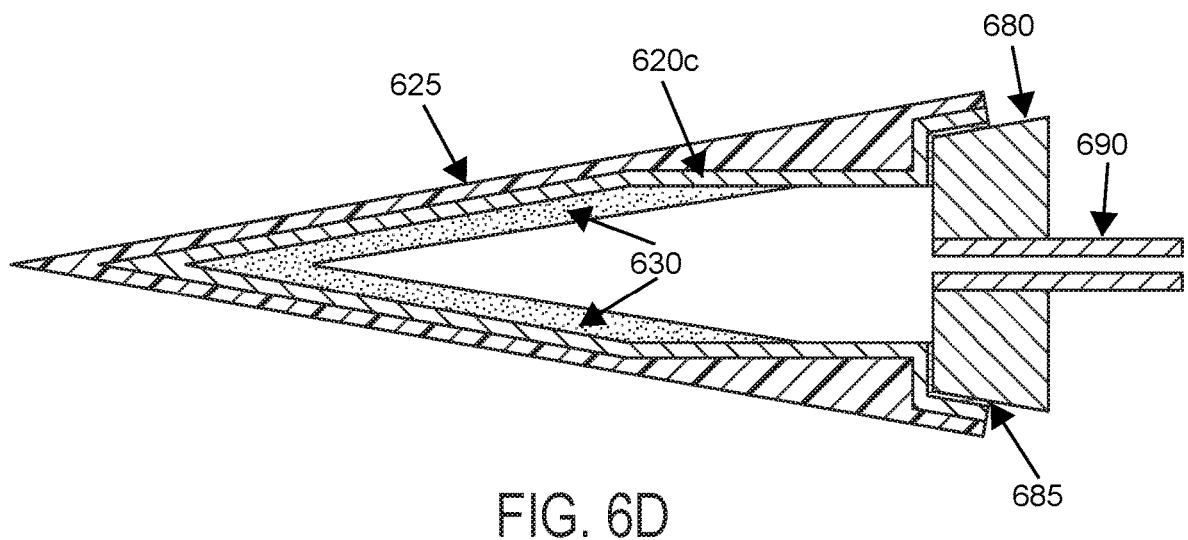
FIG. 6D depicts the hermetic sealing of a leading-edge heat pipe using a bonded end cap, in some embodiments.

As shown in FIG. 6C, the method of making a leading-edge heat pipe 100 may include inserting the porous wick 630 into the aeroshell 625. The method of making a leading-edge heat pipe 100 may include inserting the end cap 580 behind the porous wick 130 (distally from the leading edge 170) in the aeroshell 125.

The porous wick 130/630 may be optionally bonded to the aeroshell 125/625, such as via welding, brazing, diffusion bonding, chemical vapor deposition bonding, physical vapor deposition bonding, atomic layer deposition binding, or a combination thereof. This step, if performed, may be done prior to inserting the end cap 580/680.

The method of making a leading-edge heat pipe 100 may include bonding the end cap 580 to the aeroshell 125, such as via welding, brazing, diffusion bonding, chemical vapor deposition bonding, physical vapor deposition bonding, atomic layer deposition binding, or a combination thereof. Preferably, this bonding results in hermetic sealing 685 (FIG. 6D). In some embodiments, this bonding may simultaneously bond the porous wick 130 to the aeroshell 125 and/or the end cap 580.

The method of making a leading-edge heat pipe 100 may include cleaning the interior of the aeroshell 125, such as by liquid chemical cleaning, vapor chemical cleaning, plasma cleaning, or a combination thereof.

The method of making a leading-edge heat pipe 100 may include filling the interior space 110 with a working fluid 160, preferably in a low-vapor-pressure form, e.g. solid, liquid, partially condensed vapor, or a combination thereof.

The method of making a leading-edge heat pipe 100 may include evacuating non-condensed vapors from the interior space 110.

The method of making a leading-edge heat pipe 100 may include sealing the tube 690 via arc welding, laser welding, electron beam welding, cold welding, or a combination thereof, for example.

Some variations provide a method of using a leading-edge heat pipe 100.

A method of using a leading-edge heat pipe 100 may include attaching the leading-edge heat pipe 100 to a hypersonic vehicle. Exemplary hypersonic vehicles include, but are not limited to, missiles, rockets, re-entry vehicles, planes, spacecraft, and spaceplanes. A spaceplane is an aerospace vehicle that can fly like an aircraft in Earth's atmosphere and maneuver like a spacecraft in the vacuum of space.

The location of the leading-edge heat pipe 100 on the hypersonic vehicle may be a leading edge, a control surface, or an engine inlet cowl, for example. When the leading-edge heat pipe 100 is located on a control surface (e.g., at a sensor), the leading-edge heat pipe 100 may be referred to as a control-surface heat pipe. When the leading-edge heat pipe 100 is located on an engine inlet cowl, the leading-edge heat pipe 100 may be referred to as an engine-inlet heat pipe. More than one leading-edge heat pipe 100 may be installed in a single hypersonic vehicle, such as 2, 3, 4, 5, or more such leading-edge heat pipes 100.

The attachment of a leading-edge heat pipe 100 on a hypersonic vehicle may be performed by mechanical means (e.g., with screws, bolts, fasteners, etc.) and/or by bonding (e.g., by brazing, welding, diffusion bonding, etc.). Gap fillers may be included to fill or seal gaps between the leading-edge heat pipe 100 and the rest of the hypersonic vehicle.

The edge 170 is typically on the outer mold line of the hypersonic vehicle and oriented toward the front of the hypersonic vehicle. The heat-rejection surface (e.g., outer surface 115) is preferably mostly or completely on the outer mold line of the hypersonic vehicle. If included, the aft surface 580 is preferably not on the outer mold line of the hypersonic vehicle, but rather internal to the vehicle.

In some embodiments, the hypersonic vehicle is moved at a hypersonic velocity, such as about Mach 4.5, 5, 5.5, 6, 7, 8, 9, 10, 11, 12, 13, 14, 15, 16, 17, 18, 19, 20, or greater. The hypersonic vehicle may move due to its own propulsion system (e.g., a scramjet), an external propulsion system (e.g., a re-entry vehicle or a boost-glide vehicle), or a combination (e.g., start-up of a scramjet). The hypersonic vehicle may be moved at supersonic but sub-hypersonic speeds, such as about Mach 4, 3, or 2, noting that even at Mach 2 to 4, the leading-edge heat pipe 100 may be beneficial for rejecting heat at a leading edge. While the hypersonic vehicle is speeding up for flight or slowing down from flight, the speed may be Mach 1 or less.

When the hypersonic vehicle with leading-edge heat pipe 100 moves at a hypersonic velocity (hypersonic flight), the following steps will occur automatically (passively).

The leading-edge heat pipe 100 will heat up due to aerothermal heating in hypersonic flow. The edge 170 will heat up more than the rest of the leading-edge heat pipe 100. Heat will conduct through the envelope 105 and heat up the working fluid. If partially or completely frozen, the working fluid will melt, forming a liquid phase of working fluid. The working fluid partially, but not completely, vaporizes.

The leading-edge heat pipe 100 then functions as a heat pipe or vapor chamber, during hypersonic flight. The liquid phase of the working fluid moves toward the edge 170, driven by capillary flow in the porous wick 130. The liquid phase vaporizes at the hottest regions in the interior space 110, which will be across the envelope 105 wall from the edge 170. This will transfer heat from the envelope 105 to the vapor. The vapor phase moves away from the hottest regions in the interior space 110, driven by a pressure gradient. The vapor condenses on the (relatively) cooler regions in the interior space 110, which will be across the envelope 105 wall from the heat-rejection surface 115. This will transfer heat from the vapor to the envelope 105. Heat will conduct across the envelope 105 wall and radiate away from the leading-edge heat pipe 100.

The device may be capable of a heat flux of about, or at least about, 400 W/cm$^2$, 500 W/cm$^2$, 600 W/cm$^2$, 700 W/cm$^2$, 800 W/cm$^2$, 900 W/cm$^2$, 1000 W/cm$^2$, 1500 W/cm$^2$, 2000 W/cm$^2$, 2500 W/cm$^2$, or greater. By "capable of a heat flux" it is meant that leading-edge heat pipe 100 includes a porous wick 130 and working fluid 160 selected and designed to give the stated stagnation-point heat flux under steady-state hypersonic operation. The actual heat flux during operation may be less than the maximum heat flux possible for the leading-edge heat pipe 100, such as when the speed is less than maximum, altitude is higher than minimum, etc.

A leading-edge heat pipe 100 that is capable of a certain heat flux at steady state preferably is characterized by low erosion of the edge 170 during operation of the leading-edge heat pipe 100. Low erosion of the edge 170, in turn, means that there is edge erosion less than 1 millimeter in any dimension for at least 100 seconds, preferably at least 10 minutes, more preferably at least 20 minutes, and most preferably at least 30 minutes (e.g., 1 to 24 hours).

The leading-edge heat pipe 100 may operate as a heat pipe at temperatures ranging from 600° C. to 2300° C., for example. When operating as a heat pipe in isothermal conditions, the temperature across the leading-edge heat pipe 100 may vary by less than 500° C., less than 400° C., less than 300° C., less than 200° C., or less than 100° C. The leading-edge heat pipe 100 may transport heat through evaporation and condensation of the working fluid outside of the isothermal operation window (e.g., at lower temperatures) or in transient response (e.g. before reaching steady state). In these cases, the temperature across the leading-edge heat pipe 100 will be greater than if operating in the isothermal condition, but will be smaller than if no working fluid were present.

In some embodiments, the leading-edge heat pipe has a maximum surface temperature of about 2300° C., 2200° C., 2100° C., 2000° C., 1900° C., 1800° C., 1700° C., 1600° C., 1500° C., 1400° C., 1300° C., 1200° C., 1100° C., 1000° C., or less. Typically, the leading edge is subjected to a heat flux and then reaches a given surface temperature in response to the heat flux. Thus, the maximum surface temperature may correspond to a heat flux of about 500 W/cm$^2$ to about 2500 W/cm$^2$, or greater, at the stagnation point.

A skilled artisan can calculate or simulate vehicle speed, altitude, maneuverability, and range (distance) that is possible with a hypersonic vehicle having one or more devices 100. See: Anderson Jr., *Hypersonic and High-Temperature Gas Dynamics, Second Edition (AIAA Education Series)*, 2nd Edition, 2006 (ISBN-13: 978-1563477805), which is hereby incorporated by reference herein. Among other parameters, the maximum stagnation-point heat flux, the maximum possible operation speed (Mach number), and the maximum operation free-stream air density (i.e., lowest altitude) may be calculated for a given hypersonic vehicle including leading-edge heat pipe 100.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An aerospace vehicle leading-edge heat pipe comprising:
    (a) an envelope fabricated from a shell material forming a portion of the outer shell of the aerospace vehicle, wherein said envelope includes at least one edge with a radius of curvature of less than 3 mm, wherein said envelope has a thickness that increases with distance from said edge, wherein said envelope has an outer surface and an inner surface that encloses an interior cavity, and wherein said envelope includes, or is in thermal communication with, at least one heat-rejection surface, forming a leading edge of the aerospace vehicle;
    (b) a porous wick fabricated from a ceramic or metallic wick material, wherein said porous wick is configured within a first portion of said interior cavity, wherein at least a portion of said porous wick is adjacent to said inner surface, and wherein said porous wick contains an exterior wick region and a plurality of interior wick regions, wherein the porous wick has a bimodal pore distribution comprising pores in the interior wick regions having a greater size than the pores in the exterior wick region; and
    (c) a phase-change heat-transfer material contained within said porous wick.

2. The aerospace vehicle leading-edge heat pipe of claim 1, wherein said porous wick is at least partially coated with a wick coating selected for chemical compatibility between said wick coating and said phase-change heat-transfer material.

3. The aerospace vehicle leading-edge heat pipe of claim 2, wherein said wick coating includes a wick-coating material selected from the group consisting of refractory metals or alloys thereof, nickel alloys, nickel superalloys, intermetallics, ceramics, and combinations thereof.

4. The aerospace vehicle leading-edge heat pipe of claim 1, wherein said shell material is selected from the group consisting of carbon-carbon composites, ceramic matrix composites, metal matrix composites, refractory metals, metal alloys, metal superalloys, and combinations thereof.

5. The aerospace vehicle leading-edge heat pipe of claim 1, wherein said ceramic or metallic wick material is selected from the group consisting of pyrolytic carbon, SiOC, SiC, Si3N4, silica, alumina, aluminum silicates, rare-earth silicates, rare earth aluminates, and combinations thereof.

6. The aerospace vehicle leading-edge heat pipe of claim 1, wherein said shell coating includes a shell-coating material selected from the group consisting of refractory metals or alloys thereof, nickel alloys, nickel superalloys, intermetallics, ceramics, and combinations thereof.

7. The aerospace vehicle leading-edge heat pipe of claim 1, wherein said shell material is a carbon-carbon composite, wherein said ceramic or metallic wick material is a ceramic, and wherein said phase-change heat-transfer material is an alkali metal.

8. The aerospace vehicle leading-edge heat pipe of claim 1, wherein said phase-change heat-transfer material is selected from the group consisting of lithium, sodium, zinc, silver, potassium, cesium, and combinations or alloys thereof.

9. The aerospace vehicle leading-edge heat pipe of claim 1, wherein said phase-change heat-transfer material is further contained within a second portion of said interior cavity that is outside said first portion of said interior cavity, and wherein said second portion of said interior cavity does not contain said porous wick.

10. The aerospace vehicle leading-edge heat pipe of claim 1, wherein said at least one heat-rejection surface is the same as said outer surface.

11. The aerospace vehicle leading-edge heat pipe of claim 1, wherein said at least one heat-rejection surface is different than said outer surface.

12. The aerospace vehicle leading-edge heat pipe of claim 1, wherein said leading-edge heat pipe is hermetically sealed.

13. The aerospace vehicle leading-edge heat pipe of claim 1, wherein the aerospace vehicle is a hypersonic vehicle.

14. The leading-edge heat pipe of claim 1, wherein said porous wick does not occupy all of said interior cavity.

15. The aerospace vehicle leading-edge heat pipe of claim 1, wherein said porous wick contains interconnected pores with a porosity ranging from about 25% to about 95%.

16. The aerospace vehicle leading-edge heat pipe of claim 1, wherein said porous wick contains pores with an average pore diameter from about 0.2 pm to about 2 mm.

17. The aerospace vehicle leading-edge heat pipe of claim 1, wherein said porous wick includes a distribution of pore sizes.

18. An aerospace vehicle leading-edge heat pipe comprising:
(a) an envelope fabricated from a shell material forming a portion of the outer shell of the aerospace vehicle, wherein said envelope includes at least one edge with a radius of curvature of less than 12 mm, forming a leading edge of the aerospace vehicle, wherein said envelope has a thickness that increases with distance from said edge, wherein said envelope has an outer surface and an inner surface that encloses an interior cavity, and wherein said envelope includes, or is in thermal communication with, at least one heat-rejection surface;
(b) a porous wick fabricated from a ceramic or metallic wick material, wherein said porous wick is configured within a first portion of said interior cavity, wherein at least a portion of said porous wick is adjacent to said inner surface, and wherein said porous wick has a bimodal pore distribution comprising an exterior wick region having an average capillary-pore size from about 0.2 microns to about 200 microns and a plurality of interior wick regions having an average high-flow pore size from about 100 microns to about 2 millimeters, wherein said average high-flow pore size is greater than said average capillary-pore size
(c) a phase-change heat-transfer material contained within said porous wick.

19. The aerospace vehicle leading-edge heat pipe of claim 18, wherein said inner surface of said shell material is at least partially coated with a shell coating selected for chemical compatibility between said shell coating and said phase-change heat-transfer material.

20. The aerospace vehicle leading-edge heat pipe of claim 18, wherein said porous wick is at least partially coated with a wick coating selected for chemical compatibility between said wick coating and said phase-change heat-transfer material.

21. The aerospace vehicle leading-edge heat pipe of claim 18, wherein said shell material is a carbon-carbon composite, wherein said ceramic or metallic wick material is a ceramic, wherein said phase-change heat-transfer material is an alkali metal, and wherein said inner surface of said shell material is at least partially coated with a shell coating selected for chemical compatibility between said shell coating and said phase-change heat-transfer material.

22. The aerospace vehicle leading-edge heat pipe of claim 18, wherein said ceramic or metallic wick material is selected from the group consisting of pyrolytic carbon, SiOC, SiC, Si3N4, silica, alumina, aluminum silicates, rare-earth silicates, rare earth aluminates, and combinations thereof.

23. The aerospace vehicle leading-edge heat pipe of claim 18, wherein at least some of said porous wick contains an interior wick region and an exterior wick region, wherein said interior wick region includes high-flow pores with said average high-flow pore size, and wherein said exterior wick region includes capillary pores with said average capillary-pore size.

24. The aerospace vehicle leading-edge heat pipe of claim 18, wherein said radius of curvature is less than 6 mm.

25. The aerospace vehicle leading-edge heat pipe of claim 24, wherein said radius of curvature is less than 3 mm.

26. The aerospace vehicle leading-edge heat pipe of claim 18, wherein said leading-edge heat pipe is hermetically sealed.

27. The aerospace vehicle leading-edge heat pipe of claim 18, wherein the aerospace vehicle is a hypersonic vehicle.

* * * * *